(12) United States Patent
Huo et al.

(10) Patent No.: US 12,444,220 B2
(45) Date of Patent: Oct. 14, 2025

(54) CHARACTER SEGMENTATION METHOD AND DEVICE BASED ON EDGE DETECTION AND CONTOUR DETECTION

(71) Applicant: CANAAN BRIGHT SIGHT CO., LTD, Beijing (CN)

(72) Inventors: Chenghai Huo, Beijing (CN); Nangeng Zhang, Beijing (CN)

(73) Assignee: CANAAN BRIGHT SIGHT CO., LTD, Beijing (CN)

( * ) Notice: Subject to any disclaimer, the term of this patent is extended or adjusted under 35 U.S.C. 154(b) by 368 days.

(21) Appl. No.: 17/782,683

(22) PCT Filed: Sep. 29, 2020

(86) PCT No.: PCT/CN2020/118675
§ 371 (c)(1),
(2) Date: Jun. 6, 2022

(87) PCT Pub. No.: WO2021/109697
PCT Pub. Date: Jun. 10, 2021

(65) Prior Publication Data
US 2023/0009564 A1    Jan. 12, 2023

(30) Foreign Application Priority Data

Dec. 5, 2019 (CN) .......................... 201911233988.5
Dec. 5, 2019 (CN) .......................... 201911234826.3

(51) Int. Cl.
*G06V 30/18* (2022.01)
*G06V 30/148* (2022.01)
*G06V 30/182* (2022.01)

(52) U.S. Cl.
CPC ........ *G06V 30/1801* (2022.01); *G06V 30/148* (2022.01); *G06V 30/18019* (2022.01); *G06V 30/182* (2022.01)

(58) Field of Classification Search
None
See application file for complete search history.

(56) References Cited

U.S. PATENT DOCUMENTS

| 7,302,098 B2 * | 11/2007 | Tang ...................... G06V 20/62 |
| | | 382/177 |
| 8,509,534 B2 * | 8/2013 | Galic ..................... G06V 10/44 |
| | | 382/176 |

(Continued)

FOREIGN PATENT DOCUMENTS

| CN | 102426649 A | 4/2012 |
| CN | 104156704 A | 11/2014 |

(Continued)

OTHER PUBLICATIONS

EPO Extended European search report & search opinion in European Patent Application No. 20895306.7 (Year: 2023).*

(Continued)

*Primary Examiner* — Scott A Rogers
(74) *Attorney, Agent, or Firm* — Blank Rome LLP

(57) ABSTRACT

A character segmentation method and apparatus, and a computer-readable storage medium are provided. The method includes converting a character area image into a grayscale image; converting the grayscale image into an edge binary image by edge detection; acquiring character box segmentation blocks from the edge binary image by projection; and determining a target character area from the character box segmentation blocks by contour detection, and performing character segmentation on the character area image according to the target character area; or comprises: converting a character area image into a grayscale image; performing clustering analysis on the grayscale image by fuzzy C-means clustering, and binarizing the grayscale image according to the analysis result; acquiring character positioning blocks from a binary image by projection; and (Continued)

performing character segmentation on the character area image according to position information of the character positioning blocks. Character segmentation can be performed on a relatively low quality image.

8 Claims, 7 Drawing Sheets

(56) References Cited

U.S. PATENT DOCUMENTS

| | | | |
|---|---|---|---|
| 9,158,986 B2 * | 10/2015 | Nakamura | G06V 30/153 |
| 9,305,224 B1 * | 4/2016 | Chen | G06V 20/584 |
| 9,324,001 B2 * | 4/2016 | Nakamura | G06V 30/153 |
| 9,959,487 B2 * | 5/2018 | Gao | G06V 30/153 |
| 10,095,925 B1 * | 10/2018 | Tripuraneni | G06V 30/12 |
| 10,922,572 B2 * | 2/2021 | Gao | B60K 35/60 |
| 2006/0120602 A1 | 6/2006 | Tang et al. | |
| 2013/0259383 A1 | 10/2013 | Kondo et al. | |
| 2015/0039637 A1 | 2/2015 | Neuhauser et al. | |
| 2018/0068196 A1 | 3/2018 | Quentin et al. | |

FOREIGN PATENT DOCUMENTS

| | | | |
|---|---|---|---|
| CN | 105373794 A | | 3/2016 |
| CN | 105825212 A | | 8/2016 |
| CN | 109522889 A | | 3/2019 |
| CN | 109543688 A | | 3/2019 |
| CN | 109598271 A | | 4/2019 |
| CN | 109726717 A | | 5/2019 |
| CN | 110097046 A | * | 8/2019 |
| CN | 111027546 A | | 4/2020 |
| CN | 111046862 A | | 4/2020 |
| CN | 113378847 B | * | 10/2022 |
| CN | 115984863 B | * | 5/2023 |
| JP | 8-264591 A | | 10/1996 |
| JP | H1196292 A | | 4/1999 |
| JP | 2013-210785 A | | 10/2013 |
| JP | 2017-27201 A | | 2/2017 |

OTHER PUBLICATIONS

JPO Notice of Reasons for Refusal in Japanese Patent Application No. 2024-018589 (Year: 2024).*

JPO Notice of Reasons for Refusal in Japanese Patent Application No. 2022-533643 (Year: 2023).*

Hongxi Wei et al., "An Efficient Binarization Method for Ancient Mongolian Document Images", 2010 3rd International Conference on Advanced Computer Theory and Engineering (ICACTE).

Christos-Nikolaos E. Anagnostopoulos et al., "License Plate Recognition From Still Images and Video Sequences: A Survey", IEEE Transactions on Intelligent Transportation Systems, vol. 9, No. 3, Sep. 2008, pp. 377-391.

Hideo Kasuga et al., "Fuzzy Clustering for Text Extract from Color Image", Faculty of Engineering, Shinshu University, 1999.

* cited by examiner

CHARACTER SEGMENTATION METHOD AND DEVICE BASED ON EDGE DETECTION AND CONTOUR DETECTION

CROSS-REFERENCE TO RELATED APPLICATIONS

This application is a National Stage of International patent application PCT/CN2020/118675, filed Sep. 29, 2020, which claims priority to foreign Chinese patent application Nos. CN 201911233988.5 and 201911234826.3, filed Dec. 5, 2019, the disclosures of which are incorporated by reference in their entireties.

TECHNICAL FIELD

The present disclosure belongs to the field of digital image processing technologies, and in particular relates to a character segmentation method and device, and a computer-readable storage medium.

BACKGROUND

This section is intended to provide background or context to the embodiments of the present disclosure as set forth in claims. What is described in this section is not admitted to be prior art by virtue of its inclusion in this section.

At present, although novel electronic meters have been widely applied, there still exist a great number of older model digital meters in the industrial environment, which cannot be replaced by new model electronic meters because of the production environment which does not allow disruptions. A common solution to the above situation is to install cameras on the older model meters to capture images for remote meter reading. In this regard, the character segmentation function, as a foundation and core of the remote meter reading system, directly determines the system's quality.

In the current character segmentation method, the segmented characters are generally acquired by means of projection after performing binarization on the character region image of the meter. Binarization methods generally include edge detection approach, histogram thresholding approach, and clustering technique.

However, in the process of implementing the aforesaid solution, the inventors found the following technical problems.

In the actual production environment, the meter face may have rust, stains, reflections or other problems, resulting in the captured images as shown in FIG. 2. Furthermore, when the aforesaid edge detection approach is employed for the character segmentation, many false edges caused by factors such as stains or reflections will be introduced if a relatively loose parameter setting is chosen (more complete character edges can be obtained); while a relatively strict parameter setting may result in loss of edge information of target characters. When the other two approaches are employed, there exists a rather serious problem of character adhesion, which will directly affect the character segmentation effect, and thus affect the accuracy of subsequent character recognition.

SUMMARY

In view of the aforesaid problem in the prior art regarding the difficulty in performing character segmentation on images with poor quality, the present disclosure provides a character segmentation method and device, and a computer-readable storage medium, by means of which the aforesaid problem can be solved.

The present disclosure provides following solutions.

In a first aspect, provided is a character segmentation method. The method includes: acquiring a character region image and converting the character region image into a grayscale image, where the character region image includes at least one character frame; converting the grayscale image into an edge binary image by utilizing an edge detection algorithm; acquiring from the edge binary image at least one segment for the at least one character frame by utilizing a projection approach; and determining a target character region from each of the at least one segment by utilizing a contour detection algorithm, and performing character segmentation on the character region image based on the target character region.

Preferably, the method, prior to converting the grayscale image into the edge binary image by utilizing the edge detection algorithm, further includes performing filtering on the grayscale image, where the filtering is median filtering and/or Gaussian filtering.

Preferably, converting the grayscale image into the edge binary image by utilizing the edge detection algorithm includes: performing edge detection on the grayscale image by utilizing a Canny operator; and converting the grayscale image into the edge binary image based on a result of the edge detection.

Preferably, the method, prior to performing the edge detection on the grayscale image by utilizing the Canny operator, further includes: detecting an image quality characteristic of the grayscale image; and adjusting at least one parameter of the Canny operator adaptively based on the image quality characteristic of the grayscale image, where the image quality characteristic includes at least one selected from a global contrast and a global grayscale mean value.

Preferably, acquiring from the edge binary image the at least one segment for the at least one character frame by utilizing the projection approach includes: performing segmentation on the edge binary image by a vertical projection, to acquire the at least one segment respectively corresponding to the at least one character frame.

Preferably, determining the target character region from each of the at least one segment by utilizing the contour detection algorithm includes: determining a character contour in each of the at least one segment by utilizing the contour detection algorithm; and determining the target character region based on a minimum enclosing rectangle region of the character contour in each of the at least one segment.

In a second aspect, further provided is a character segmentation device. The device includes: an acquisition module configured to acquire a character region image and convert the character region image into a grayscale image, where the character region image includes at least one character frame; an edge detection module configured to convert the grayscale image into an edge binary image by utilizing an edge detection algorithm; a projection module configured to acquire from the edge binary image at least one segment for the at least one character frame by utilizing a projection approach; and a contour detection module configured to determine a target character region from each of the at least one segment by utilizing a contour detection algorithm and perform character segmentation on the character region image based on the target character region.

Preferably, the device further includes a filtering module configured to perform filtering on the grayscale image before the grayscale image is converted into the edge binary image by utilizing the edge detection algorithm, where the filtering is median filtering and/or Gaussian filtering.

Preferably, the edge detection module is configured to perform edge detection on the grayscale image by utilizing a Canny operator and convert the grayscale image into the edge binary image based on a result of the edge detection.

Preferably, the edge detection module is configured to detect an image quality characteristic of the grayscale image and adjust at least one parameter of the Canny operator adaptively based on the image quality characteristic of the grayscale image, where the image quality characteristic includes at least one selected from a global contrast and a global grayscale mean value.

Preferably, the projection module is configured to perform segmentation on the edge binary image by a vertical projection, to acquire the at least one segment respectively corresponding to the at least one character frame.

Preferably, the contour detection module is configured to determine a character contour in each of the at least one segment by utilizing the contour detection algorithm and determine the target character region based on a minimum enclosing rectangle region of the character contour in each of the at least one segment.

In a third aspect, further provided is an intelligent meter reading system. The system includes: a meter with a face including at least one character frame for displaying a reading; a camera device for photographing the face of the meter to acquire a character region image; and a character segmentation device electrically connected to the camera device and configured to implement any of the aforesaid character segmentation methods.

In a fourth aspect, further provided is a character segmentation device. The device includes one or more multi-core processors, and a memory having one or more programs stored therein; where the one or more programs, when executed by the one or more multicore processors, cause the one or more multicore processors to implement operations of: acquiring a character region image and converting the character region image into a grayscale image, where the character region image includes at least one character frame; converting the grayscale image into an edge binary image by utilizing an edge detection algorithm; acquiring from the edge binary image at least one segment for the at least one character frame by utilizing a projection approach; and determining a target character region from each of the at least one segment by utilizing a contour detection algorithm, and performing character segmentation on the character region image based on the target character region.

In a fifth aspect, further provided is a computer-readable storage medium having programs stored thereon, where the programs, when executed by a multicore processor, cause the multicore processor to implement any of the aforesaid character segmentation methods.

At least one of the aforesaid technical solutions from the first aspect to the fifth aspect adopted in embodiments of the present disclosure can achieve the following beneficial effects. By utilizing the edge detection algorithm in combination with the contour detection algorithm, the character segmentation solutions in the present disclosure performs multiple detections on the character region images, thereby enabling character segmentation of images with poor quality, and thus can solve the problem of difficulty in determining the segmentation limit in the character segmentation process.

In a sixth aspect, provided is a character segmentation method. The method includes: acquiring a character region image and converting the character region image into a grayscale image; performing a cluster analysis on the grayscale image by utilizing a fuzzy C-means clustering algorithm and performing binarization on the grayscale image based on a result of the cluster analysis to acquire a binary image; acquiring at least one character localization block from the binary image by utilizing a projection approach; and performing character segmentation on the character region image based on position information of the at least one character localization block.

Preferably, the method, prior to performing the cluster analysis on the grayscale image by utilizing the fuzzy C-means clustering algorithm, further includes: performing edge detection on the grayscale image by utilizing a Canny operator to acquire an edge image; performing straight line detection on the edge image by utilizing a Hough transform equation to acquire a boundary in the edge image; and removing a border portion of the grayscale image based on the boundary.

Preferably, the method, prior to performing the edge detection on the grayscale image by utilizing the Canny operator, further includes: detecting an image quality characteristic of the grayscale image; and adjusting at least one parameter of the Canny operator adaptively based on the image quality characteristic of the grayscale image, where the image quality characteristic at least includes a global contrast and/or a global grayscale mean value.

Preferably, the method, prior to performing the edge detection on the grayscale image by utilizing the Canny operator, further includes performing filtering on the grayscale image, where the filtering includes median filtering and/or Gaussian filtering.

Preferably, the method, prior to performing the cluster analysis on the grayscale image by utilizing the fuzzy C-means clustering algorithm, further includes performing logarithmic transformation on the grayscale image.

Preferably, performing the cluster analysis on the grayscale image by utilizing the fuzzy C-means clustering algorithm and performing the binarization on the grayscale image based on the result of the cluster analysis includes: performing clustering on the grayscale image by utilizing the fuzzy C-means clustering algorithm to acquire C clusters; determining attributes of the C clusters based on clustering centers of the C clusters respectively; determining, for each pixel of the grayscale image, C membership degrees respectively corresponding to the C clusters; sorting the C clusters according to the C membership degrees to determine N clusters therein and determining an attribute of said each pixel of the grayscale image based on attributes of the N clusters; and performing the binarization on the grayscale image based on the attribute of said each pixel of the grayscale image; where the C and the N are positive integers and the C is greater than the N.

Preferably, after acquiring at least one character localization block from the binary image by utilizing the projection approach, the method further includes: detecting a foreground pixel area of each of the at least one character localization block; and detecting an interference block from the at least one character localization block based on the foreground pixel area and excluding the interference block from the at least one character localization block; where the foreground pixel area in the interference block is at least less than any of foreground pixel areas of M character localization blocks among the at least one character localization block, where the M refers to the predetermined number of characters.

Preferably, after acquiring at least one character localization block from the binary image by utilizing the projection approach, the method further includes excluding an interference block from the at least one character localization block by utilizing a non-nearest suppression algorithm.

Preferably, performing the character segmentation on the character region image based on position information of the at least one character localization block includes: determining an average width of the at least one character localization block; and performing, if a target character localization block having a smaller width than the average width is present in the at least one character localization block, the character segmentation on the character region image based on position information of the target character localization block and the average width.

In a seventh aspect, provided is a character segmentation device. The device includes: an acquisition module configured to acquire a character region image and convert the character region image into a grayscale image; a clustering module configured to perform a cluster analysis on the grayscale image by utilizing a fuzzy C-means clustering algorithm and perform binarization on the grayscale image based on a result of the cluster analysis to acquire a binary image; a localization module configured to acquire at least one character localization block from the binary image by utilizing a projection approach; and a segmentation module configured to perform character segmentation on the character region image based on position information of the at least one character localization block.

Preferably, the device further includes: an edge detection module configured to perform edge detection on the grayscale image by utilizing a Canny operator to acquire an edge image; a straight line detection module configured to perform straight line detection on the edge image by utilizing a Hough transform equation to acquire a boundary in the edge image; and a border removing module configured to remove a border portion of the grayscale image based on the boundary.

Preferably, the edge detection module further includes: a quality detection module configured to detect an image quality characteristic of the grayscale image; and a parameter adjustment module configured to adjust at least one parameter of the Canny operator adaptively based on the image quality characteristic of the grayscale image; where the image quality characteristic at least includes a global contrast and/or a global grayscale mean value.

Preferably, the device further includes: a filtering module configured to perform filtering on the grayscale image, where the filtering includes median filtering and/or Gaussian filtering.

Preferably, the device further includes a logarithmic transformation module configured to perform logarithmic transformation on the grayscale image.

Preferably, the clustering module is configured to: perform clustering on the grayscale image by utilizing the fuzzy C-means clustering algorithm to acquire C clusters; determine attributes of the C clusters based on clustering centers of the C clusters respectively; determine, for each pixel of the grayscale image, C membership degrees respectively corresponding to the C clusters; sort the C clusters according to the C membership degrees to determine N clusters therein and determine an attribute of said each pixel of the grayscale image based on attributes of the N clusters; and perform the binarization on the grayscale image based on the attribute of said each pixel of the grayscale image; where the C and the N are positive integers and the C is greater than the N.

Preferably, the device further includes a first exclusion module configured to: detect a foreground pixel area of each of the at least one character localization block; and detect an interference block from the at least one character localization block based on the foreground pixel area and exclude the interference block from the at least one character localization block; where the foreground pixel area in the interference block is at least less than any of foreground pixel areas of M character localization blocks among the at least one character localization block, where the M refers to the predetermined number of characters.

Preferably, the device further includes a second exclusion module configured to exclude an interference block from the at least one character localization block by utilizing a non-nearest suppression algorithm.

Preferably, the segmentation module is configured to: determine an average width of the at least one character localization block; and perform, if a target character localization block having a smaller width than the average width is present in the at least one character localization block, the character segmentation on the character region image based on position information of the target character localization block and the average width.

In an eighth aspect, provided is a character segmentation device. The device includes one or more multicore processors, and a memory having one or more programs stored therein; where the one or more programs, when executed by the one or more multicore processors, cause the one or more multicore processors to implement operations of: acquiring a character region image and converting the character region image into a grayscale image; performing a cluster analysis on the grayscale image by utilizing a fuzzy C-means clustering algorithm and performing binarization on the grayscale image based on a result of the cluster analysis to acquire a binary image; acquiring at least one character localization block from the binary image by utilizing a projection approach; and performing character segmentation on the character region image based on position information of the at least one character localization block.

In a ninth aspect, provided is a computer-readable storage medium having programs stored therein, where the programs, when executed by a multicore processor, cause the multicore processor to implement any of the aforesaid methods.

In a tenth aspect, further provided is an intelligent meter reading system. The system includes: a meter with a face for displaying characters; a camera device for photographing the face of the meter to acquire a character region image; and a character segmentation device electrically connected to the camera device and configured to implement any method according to the sixth aspect.

At least one of the aforesaid technical solutions from the sixth aspect to the tenth aspect in embodiments of the present disclosure can achieve the following beneficial effects. The character segmentation solution according to the present disclosure performs binarization on an original character region image by utilizing a fuzzy C-means clustering algorithm, thereby being able to acquire a binary image with most of the stains, reflections and other interferences removed, such that more accurate character segmentation position can be acquired from the binary image by utilizing the projection approach. As a result, a relatively accurate character segmentation effect can be achieved for character region images with poor image quality. At least one of the aforesaid technical solutions adopted in embodiments of the present disclosure can achieve the following beneficial effects. By utilizing the edge detection algorithm in combination with the contour detection algorithm, the character segmentation solution in the present disclosure performs multiple detections on the character region images, thereby enabling character segmentation of images with poor quality, and thus can solve the problem of difficulty in determining the segmentation limit in the character segmentation process.

It should be understood that the aforesaid description only shows a summary of the technical solutions of the present disclosure for better understanding technical means of the present disclosure so as to implement the present disclosure in accordance with the content described in the specification. Specific embodiments of the present disclosure will be illustrated below by examples to make the above and other objects, features, and advantages of the present disclosure more apparent.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, a same reference sign is adopted to indicate a same component throughout the accompanying drawings. In the accompanying drawings.

In the accompanying drawings, the same or corresponding reference signs indicate same or corresponding portions.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "include" or "have" are intended to indicate the existence of the characteristics, figures, steps, actions, components, parts disclosed by the specification or a combination thereof, without excluding the existence of one or more other characteristics, figures, steps, actions, components, parts or a combination thereof.

Furthermore, it should be noted that, in the case of no conflict, the embodiments of the present disclosure and features of the embodiments may be combined with each other in any manner. The present disclosure will be described in detail below with reference to the accompanying drawings and embodiments.

Figure 1:
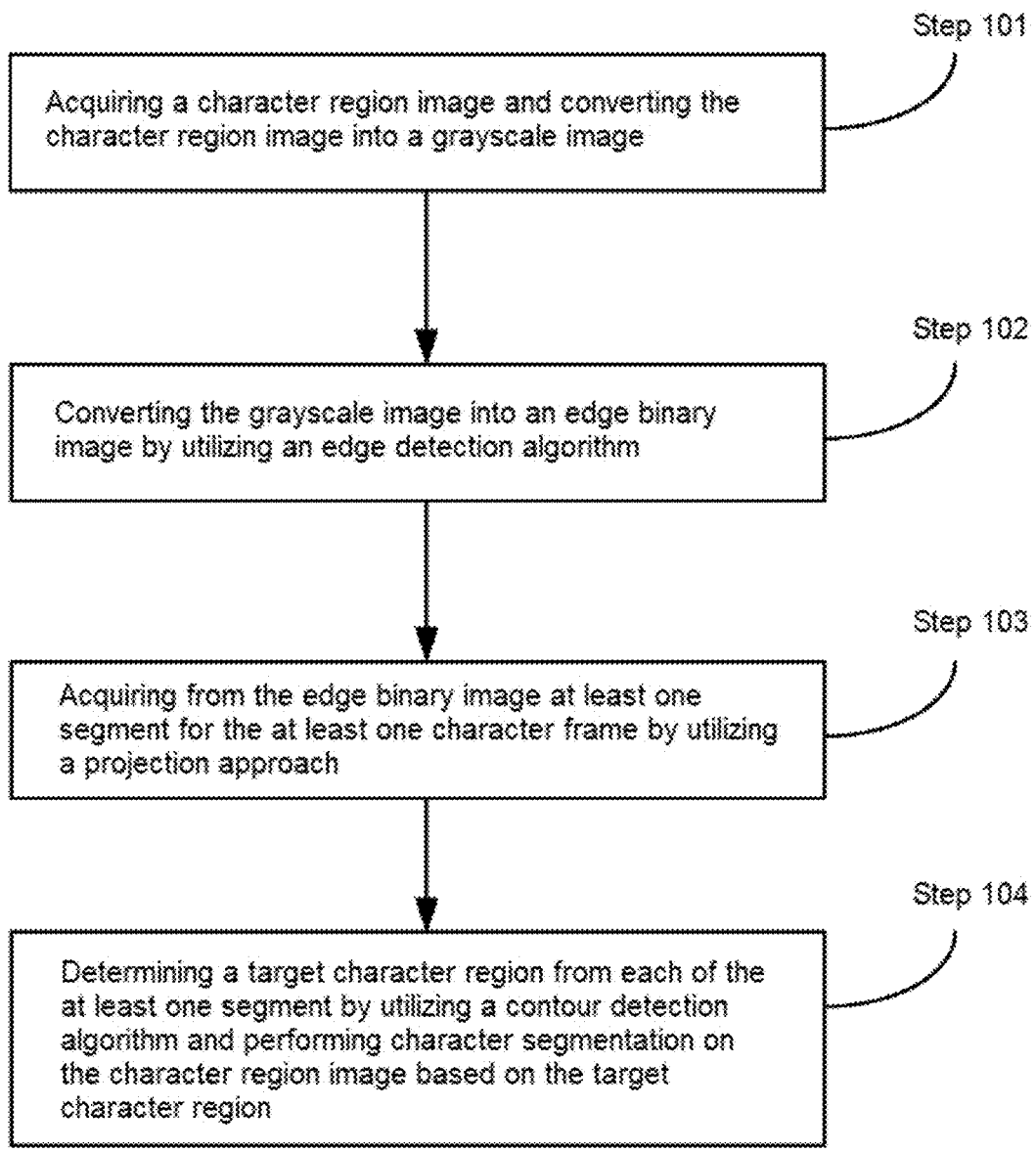
FIG. 1 is a schematic flowchart of a character segmentation method according to an embodiment of the present disclosure.

FIG. 1 is a schematic flowchart of a character segmentation method 100 according to an embodiment of the present disclosure. The character segmentation method 100 is intended to segment a character region image of a meter into character images to facilitate the execution of character recognition. In this process, the execution subject may be one or more electronic devices in terms of device, and more particularly at least one camera-related processing module in said one or more electronic devices; and the execution subject may accordingly be at least one program installed on said one or more electronic devices in terms of program.

The process in FIG. 1 may include following steps 101 to 104.

Step 101: a character region image is acquired and is converted into a grayscale image.

The character region image includes at least one character frame. Particularly, the character region image may be a face image of a meter, where the face of the meter may include a plurality of character frames that may have the same size and may be regularly arranged, with each character frame being configured to display a single character for the user to read it (e.g., a digit). Optionally, the character frame may be formed into any regular shape such as a rectangle, a circle, or the like. Optionally, the meter may include, but is not limited to, a water meter, an electric meter, and a gas meter that are commonly used in daily life, and may for example be an odometer-type water meter. Furthermore, the character region image may be acquired by a camera device facing the meter face. Of course, the character region image may also be acquired from other sources, such as from other devices, or may be an existing image, which is not limited by this embodiment. Furthermore, the acquired character region image may be in RGB format, and after the character region image is acquired, the grayscale value of each pixel in the character region image may be determined by a floating point algorithm, an integer method, a shift method, an average method or other means, such that the grayscale image may be acquired by replacing the pixel values of the red, green, and blue channels in each pixel with the grayscale value. Optionally, a character region image in any other common color format is also available and may be converted into the grayscale image accordingly.

Figure 2:
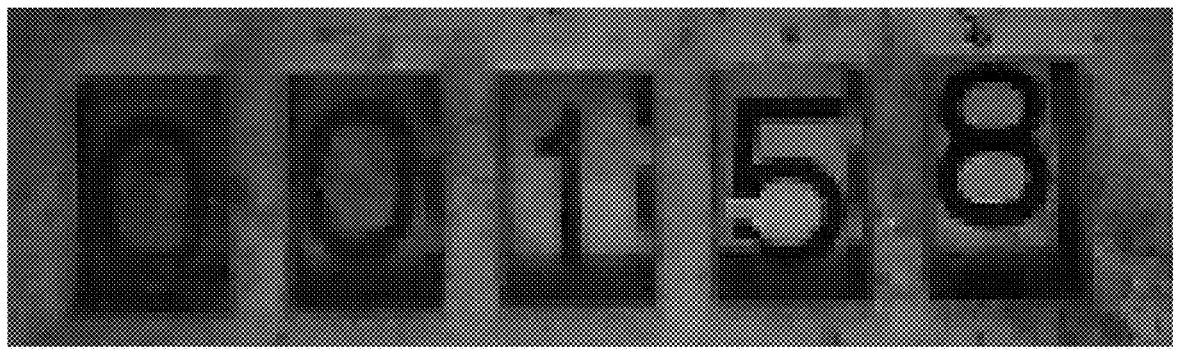
FIG. 2 is a schematic diagram of a character region image according to an embodiment of the present disclosure.

For example, referring to FIG. 2, a grayscale image of a character region image is illustrated, which includes five characters "0", "0", "1", "5", and "8" for indicating digits displayed in five character frames of the meter. It can be seen that, the characters displayed by the meter are relatively blurry due to surface stains and lighting problems, which makes it difficult to segment the characters correctly.

Step 102: the grayscale image is converted into an edge binary image by utilizing an edge detection algorithm.

Particularly, the object of utilizing the edge detection algorithm is to identify the boundaries of a plurality of character frames for displaying characters in a grayscale image. The so-called edge refers to a portion of image with the most significant local changes of intensity, which mainly exists between the target and the background and may be searched out from the gradient data of grayscale values of all pixels. Since there are generally distinct edges at the boundaries, this feature may be utilized to segment the image. Generally, the edge detection shall be implemented by the aid of an edge detection operator, and common edge detection operators include a Roberts operator, a Laplace operator, a Prewitt operator, a Sobel operator, a Rosonfeld operator, a Kirsch operator, a Canny operator, and the like. Furthermore, the edge detection may be performed on a grayscale image with one or more of the aforesaid edge detection operators to extract edge pixels, and the binarization is performed after the edge pixels are detected. It shall be noted that the edge detection may face an irreconcilable contradiction between noise immunity and detection accuracy for images with complex edges and strong noisy points. If the detection accuracy is improved, the false edges caused by noise may cause detected contours to be unreasonable; and if the noise immunity is improved, contours may be partially miss-detected. In this embodiment, since the object of the edge detection is to locate the character frames for displaying characters in the grayscale image, edge detection parameters for high noise immunity may be adopted to avoid too many false edges being detected. It shall be understood that the character frame has a smoother and more continuous boundary than the character itself. Therefore, the contour can still be displayed even if some edges are miss-detected. In addition, for a character frame with a three-dimensional effect (e.g., the character frame of a common dial-type water meter), the pixels at the character frame generally have a higher gradient than other pixels due to the effect of light and shadow projection during imaging. Optionally, in order to further acquire the aforesaid edge detection parameters for high noise immunity, a plurality of edge detection parameter sets may be preset to perform the edge detection, and an edge binary image that minimizes noisy points while maintaining the basic contours of the character frames may be selected. Optionally, in order to acquire the aforesaid edge detection parameters for high noise immunity, an edge detection parameter model may be pre-trained, such that the parameters for edge detection of grayscale images with different qualities can be adjusted adaptively to maintain a high noise immunity. For example, when the global contrast of the grayscale image is low, a great number of noisy points will be generated. In this case, the edge detection parameters can be adaptively adjusted for a higher noise immunity according to the global contrast. Optionally, the edge binary image may also be acquired by a watershed algorithm.

Figure 3A:
FIG. 3a is a schematic diagram of one edge binary image.
Figure 3B:
FIG. 3b is a schematic diagram of another edge binary image, according to an embodiment of the present disclosure.

For example, referring to FIG. 3*a* and FIG. 3*b*, the edge binary images acquired after performing the edge detection on the grayscale image shown in FIG. 2 with different edge detection parameters are illustrated. It can be seen that, the edge binary image in FIG. 3*a* is subjected to partial miss-detection of contours, and the edge binary image in FIG. 3*b* has a rather great number of false edges. In this embodiment, the edge binary image with a higher noise immunity as shown in FIG. 3*a* may be adopted, without consideration of the situation in which the digit in the leftmost character frame and the boundary of the rightmost character frame are miss-detected.

Step 103: at least one segment is acquired for the at least one character frame from the edge binary image by utilizing a projection approach.

Particularly, the aforesaid projection approach may be implemented by performing analysis on a distribution histogram of pixels of the binary image, so as to find out the boundary points between adjacent character frames for segmentation. The projection approach particularly may include vertical projection and horizontal projection. For the plurality of character frames, respective segments may be particularly determined based on the projection positions in the vertical projection profile where the projection values are at the troughs. For example, referring to FIG. 4, the edge binary image shown in FIG. 3*a* may be projected along the vertical direction to acquire a vertical projection profile, and five segments from left to right can be acquired for the character frames respectively based on the projection positions with projection values of 0 in the vertical projection profile.

Step 104: a target character region is determined from each of the at least one segment by utilizing a contour detection algorithm, and character segmentation is performed on the character region image based on the target character region.

Particularly, the object of utilizing the contour detection algorithm is to acquire the contour information by performing contour detection on the character within each segment and thereby locate an accurate target character region based on the contour information of the character. Furthermore, a character image corresponding to the target character region may be cut out from the character region image, thereby enabling the further character recognition based on the character image.

Figure 4:
FIG. 4 is a schematic diagram of segments for character frames according to an embodiment of the present disclosure.
Figure 5:
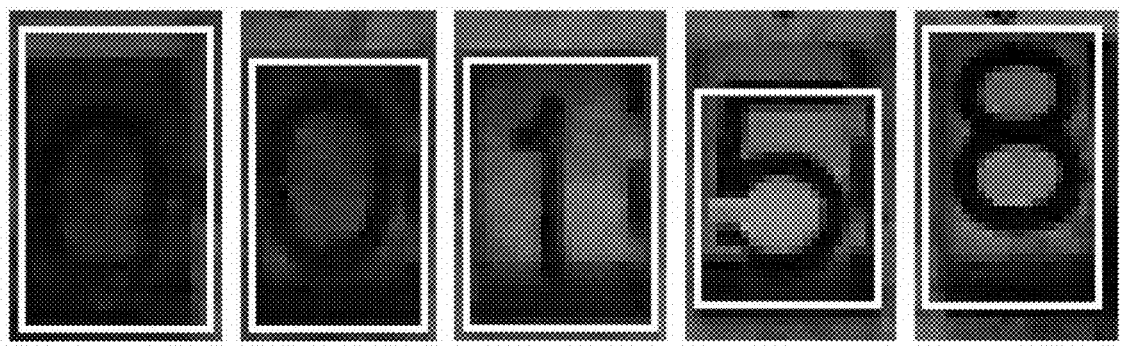
FIG. 5 is a schematic diagram of a target character region according to an embodiment of the present disclosure.

For example, referring to FIG. 5, the target character regions acquired from respective segments for the character frames as shown in FIG. 4 are illustrated, that is, the inner regions of the rectangular boxes.

In the present disclosure, the grayscale image is segmented coarsely by edge detection to acquire a coarse segmentation result corresponding to the at least one character frame, i.e., at least one segment for the at least one character frame, and then a contour detection algorithm is applied to the at least one segment to acquire at least one relatively accurate target character region respectively. By the edge detection in combination with contour detection, the character segmentation can be performed on images with poor qualities, which solves the problem of difficulty in determining the segmentation limit in the character segmentation process.

Based on the character segmentation method in FIG. 1, some embodiments of the present disclosure further provide some specific implementations and extension solutions for the character segmentation method, which will be described below.

In an embodiment, before step 102, the method 100 may further include performing filtering on the grayscale image. The filtering herein may be median filtering and/or Gaussian filtering.

Particularly, since both the edge and noise are presented as points with discontinuous changes in grayscale values and are high-frequency components in the frequency domain, it is difficult to overcome the noise influence by directly adopting the differential operations. Therefore, the image shall be smoothed and filtered before detecting the edges with the differential operator. Accordingly, Gaussian filtering and/or median filtering may be adopted in this embodiment to convolve the grayscale image, so as to reduce the significant noise influence and smooth the image. The Gaussian filtering herein is a linear smoothing filtering suitable for eliminating Gaussian noise. The median filtering is a nonlinear smoothing filtering, which sets the grayscale value of each pixel in the processed image to a median value of grayscale values of all pixels in a certain neighborhood window of said pixel. The median filtering has a good filtering effect on the impulse noise, and can protect the edges of the signal from being blurred while filtering the noise.

It should be understood that, compared to the aforesaid embodiment, Gaussian filtering and/or median filtering is performed on the grayscale image in the technical solution according to this embodiment, which can reduce the noise influence caused by stains or reflections on the meter, and thereby improve the accuracy of the subsequent edge detection.

In an embodiment, step 102 further includes: performing edge detection on the grayscale image by utilizing a Canny operator; and converting the grayscale image into the edge binary image based on a result of the edge detection.

Particularly, performing the edge detection on the grayscale image by utilizing the Canny operator may include following steps: (1) calculating the gradient intensity and direction at each pixel in the image; (2) applying non-maximum suppression to eliminate spurious responses caused by the edge detection; (3) applying double-threshold detection to determine real and potential edges; and (4) finalizing the edge detection by suppressing isolated weak edges. The double-threshold refers to two thresholds as proposed in the Canny edge detection algorithm, and particularly includes a high threshold and a low threshold. The high threshold aims to distinguish the target from the background in the image; and the low threshold aims to smooth the edges and connect the discontinuous edges to acquire contours. Particularly, a pixel is determined as an edge pixel if the gradient at said pixel is greater than the high threshold, and as a non-edge pixel if it is less than the low threshold. When the gradient at the pixel lies between the high threshold and low threshold, the pixel is determined as an edge pixel only if it is adjacent to another edge pixel.

Furthermore, the method, prior to performing the edge detection on the grayscale image by utilizing the Canny operator, further includes: detecting an image quality characteristic of the grayscale image; and adjusting parameters of the Canny operator adaptively based on the image quality characteristic of the grayscale image.

The image quality characteristic herein may include at least one selected from a global contrast and a global grayscale mean value. Particularly, in order to solve the problem of difficulty in balancing noise immunity and detection accuracy during the edge detection, the parameters in the Canny edge detection algorithm may be determined adaptively in this embodiment based on the image quality characteristic of the grayscale image. The image quality characteristic may for example be the global contrast, and the parameters in the Canny edge detection algorithm may for example be the high threshold and/or low threshold. Furthermore, a threshold model may also be pre-trained, such that the high threshold and/or low threshold may be adjusted adaptively based on the quality of the character region image on which the character segmentation is currently to be performed.

For example, if a grayscale image is detected to have a rather low global contrast, the grayscale image is presumed to have a rather low definition, and thus a high threshold and/or low threshold each having a higher value may be adopted; and if a grayscale image is detected to have a rather high global contrast, the grayscale image is presumed to have a rather high definition, and thus a high threshold and/or low threshold each having a lower value may be adopted.

It shall be understood that the high and low thresholds are determined artificially in a traditional Canny edge detection algorithm, and the ratio of the high threshold to the low threshold is fixed, which causes limitations in the application of the Canny operator. However, compared to the aforesaid embodiment, the method of adaptively adjusting the high and low thresholds according to this embodiment can reduce a large amount of undesired and unrealistic boundary information around the periphery, and further reduce the influence of noise on recognition of the defect edges, which plays a crucial role in the subsequent extraction of contours.

In an embodiment, step 103 may further include: performing segmentation on the edge binary image by utilizing a vertical projection approach, to acquire the at least one segment respectively corresponding to the at least one character frame.

Particularly, an object of the aforesaid segmentation is to segment the image regions corresponding to different character frames in the edge binary image and remove the background region in each image region as much as possible, such that the amount of computation in step 104 for contour detection can be reduced.

In an embodiment, step 104 further includes: determining a character contour in each of the at least one segment by utilizing the contour detection algorithm; and determining the target character region based on a minimum enclosing rectangle region of the character contour in each of the at least one segment.

Particularly, for each of the at least one segment acquired for the at least one character frame, the determined minimum enclosing region may accommodate the entire character contour in said each segment. Optionally, the grayscale image may also be converted into a binary image with more edge information, after which a plurality of optimized segments respectively corresponding to positions of the plurality of segments acquired for the character frames may be cut out from the binary image, and then the contour detection may be performed on the plurality of optimized segments to acquire respective optimized target character regions.

Figure 6:
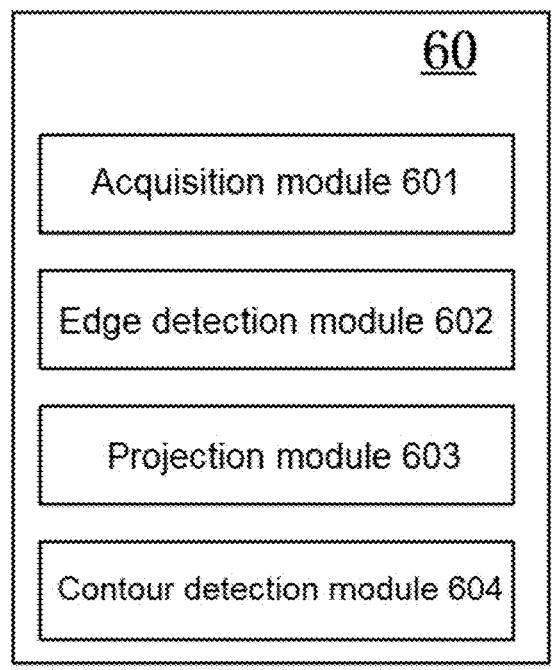
FIG. 6 is a schematic structural diagram of a character segmentation device according to an embodiment of the present disclosure.

FIG. 6 is a schematic structural diagram of a character segmentation device 60 according to an embodiment of the present disclosure for performing the character segmentation method shown in FIG. 1.

As shown in FIG. 6, the character segmentation device 60 includes an acquisition module 601 configured to acquire a character region image and convert the character region image into a grayscale image. The character region image includes at least one character frame. Particularly, the character region image may be a face image of a meter, where the face of the meter may include a plurality of character frames that may have the same size and may be regularly arranged, with each character frame being configured to display a single character for the user to read it (e.g., a digit). Optionally, the character frame may be formed into any regular shape such as a rectangle, a circle, or the like. Optionally, the meter may include, but be not limited to, a water meter, an electric meter, and a gas meter that are commonly used in daily life, and may for example be an odometer-type water meter. Furthermore, the character region image may be acquired by a camera device facing the meter face. Of course, the character region image may also be acquired from other sources, such as from other devices, or may be an existing image, which is not limited by this embodiment. Furthermore, the acquired character region image may be in RGB format, and after the character region image is acquired, the grayscale value of each pixel in the character region image may be determined by a floating point algorithm, an integer method, a shift method, an average method or other means, such that the grayscale image may be acquired by replacing the pixel values of the red, green, and blue channels in each pixel with the grayscale value.

For example, referring to FIG. 2, a grayscale image of a character region image is illustrated, which includes five characters "0", "0", "1", "5", and "8" for indicating digits displayed in five character frames of the meter. It can be seen that, the characters displayed by the meter are relatively blurry due to surface stains and lighting problems, which makes it difficult to segment the characters correctly.

In an embodiment, the character segmentation device 60 further includes an edge detection module 602 configured to convert the grayscale image into an edge binary image by utilizing an edge detection algorithm. Particularly, the object of utilizing the edge detection algorithm is to identify the boundaries of a plurality of character frames for displaying characters in a grayscale image. The so-called edge refers to a portion of image with the most significant local changes of intensity, which mainly exists between the target and the background and may be searched out from the gradient data of grayscale values of all pixels. Since there are generally distinct edges at the boundaries, this feature may be utilized to segment an image. Generally, the edge detection shall be implemented by the aid of an edge detection operator, and common edge detection operators include a Roberts operator, a Laplace operator, a Prewitt operator, a Sobel operator, a Rosonfeld operator, a Kirsch operator, a Canny operator, and the like. Furthermore, the edge detection may be performed on a grayscale image with one or more of the aforesaid edge detection operators to extract edge pixels, and the binarization is performed after the edge pixels are detected. It shall be noted that the edge detection may face an irreconcilable contradiction between noise immunity and detection accuracy for images with relatively complex edges and strong noisy points. If the detection accuracy is improved, the false edges caused by noise may cause detected contours to be unreasonable; and if the noise immunity is improved, contours may be partially miss-detected. In this embodiment, since the object of the edge detection is to locate the character frames for displaying characters in the grayscale image, edge detection parameters for high noise immunity may be adopted to avoid too many false edges being detected. It shall be understood that the character frame has a smoother and more continuous boundary than the character itself. Therefore, the contour can still be displayed even if some of the edges are miss-detected. In addition, fora character frame with a three-dimensional effect (e.g., the character frame of a common odometer-type water meter), the pixels at the character frame generally have a higher gradient than other pixels due to the effect of light and shadow projection during imaging. Optionally, in order to further acquire the aforesaid edge detection parameters for high noise immunity, a plurality of edge detection parameter sets may be preset to perform the edge detection, and an edge binary image that minimizes noisy points while maintaining the basic contour of the character frame may be selected. Optionally, in order to acquire the aforesaid edge detection parameters for high noise immunity, an edge detection parameter model may be pre-trained, such that the edge detection parameters can be adjusted adaptively for grayscale images with different qualities to maintain a high noise immunity. For example, when the global contrast of the grayscale image is rather low, a large number of noisy points will be generated, thus the edge detection parameters may be adaptively adjusted for a higher noise immunity according to the global contrast. Optionally, the edge binary image may also be acquired by a watershed algorithm.

For example, referring to FIG. 3a and FIG. 3b, the edge binary images acquired after performing the edge detection on the grayscale image shown in FIG. 2 with different edge detection parameters are illustrated. It can be seen that, the edge binary image in FIG. 3a is subjected to partial miss-detection of contours, and the edge binary image in FIG. 3b has a rather great number of false edges. In this embodiment, the edge binary image with a relatively high noise immunity as shown in FIG. 3a may be adopted, without consideration of the situation in which the digit in the leftmost character frame and the boundary of the rightmost character frame are miss-detected.

In an embodiment, the character segmentation device 60 further includes a projection module 603 configured to acquire from the edge binary image at least one segment for the at least one character frame by utilizing a projection approach. Particularly, the aforesaid projection approach may be implemented by performing analysis on a distribution histogram of pixels of the binary image, so as to find out the boundary points between adjacent character frames for segmentation. The projection approach particularly may include vertical projection and horizontal projection. For the plurality of character frames, respective segments may be particularly determined based on the projection positions in the vertical projection profile where the projection values are at the troughs. For example, referring to FIG. 4, the edge binary image shown in FIG. 3a may be projected along the vertical direction to acquire a vertical projection profile, and five segments from left to right can be acquired for the character frames respectively based on the projection positions with projection values of 0 in the vertical projection profile.

In an embodiment, the character segmentation device 60 further includes a contour detection module 604 configured to determine a target character region from each of the at least one segment by utilizing a contour detection algorithm and perform character segmentation on the character region image based on the target character region. Particularly, the object of utilizing the contour detection algorithm is to acquire the contour information by performing contour detection on the character within each segment for character frame and thereby locate an accurate target character region based on the contour information of the character. Furthermore, a character image corresponding to the target character region may be cut out from the character region image, thereby enabling the further character recognition based on the character image.

For example, referring to FIG. 5, the target character regions acquired from respective segments for the character frames as shown in FIG. 4 is illustrated, that is, the inner regions of the rectangular boxes.

In the present disclosure, the grayscale image is segmented coarsely by edge detection to acquire a coarse segmentation result corresponding to the at least one character frame, i.e., at least one segment for the at least one character frame, and then a contour detection algorithm is applied to the at least one segment to acquire at least one relatively accurate target character region respectively. By the edge detection in combination with contour detection, the character segmentation can be performed on images with poor qualities, which solves the problem of difficulty in determining the segmentation limit in the character segmentation process.

In an embodiment, the segmentation device 60 may further include a filtering module configured to perform filtering on the grayscale image before the grayscale image is converted into the edge binary image by utilizing the edge detection algorithm. The filtering herein may be median filtering and/or Gaussian filtering. Particularly, since both the edge and noise are presented as points with discontinuous changes in grayscale values and are high-frequency components in the frequency domain, it is difficult to overcome the noise influence by directly adopting the differential operations. Therefore, the image shall be smoothed and filtered before detecting the edges with the differential operator. Accordingly, Gaussian filtering and/or median filtering may be adopted in this embodiment to convolve the grayscale image, so as to reduce the significant noise influence and smooth the image. The Gaussian filtering herein may be a linear smoothing filtering suitable for eliminating Gaussian noise. The median filtering may be a nonlinear smoothing filtering, which sets the grayscale value of each pixel in the processed image to a median value of grayscale values of all pixels in a certain neighborhood window of said pixel. The median filtering has a good filtering effect on the impulse noise, and can protect the edges of the signal from being blurred while filtering the noise.

It should be understood that, compared to the aforesaid embodiment, Gaussian filtering and/or median filtering is performed on the grayscale image in the technical solution according to this embodiment, which can reduce the noise influence caused by stains or reflections on the meter, and thereby improve the accuracy of the subsequent edge detection.

In an embodiment, the edge detection module 602 may be configured to perform edge detection on the grayscale image by utilizing a Canny operator and convert the grayscale image into the edge binary image based on a result of the edge detection. Particularly, performing the edge detection on the grayscale image by utilizing the Canny operator may include following steps: (1) calculating the gradient intensity and direction at each pixel in the image; (2) applying non-maximum suppression to eliminate spurious responses caused by the edge detection; (3) applying double-threshold detection to determine real and potential edges; and (4) finalizing the edge detection by suppressing isolated weak edges. The double-threshold refers to two thresholds as proposed in the Canny edge detection algorithm, and particularly includes a high threshold and a low threshold. The high threshold aims to distinguish the target from the background in the image; and the low threshold aims to smooth the edges and connect the discontinuous edges to acquire contours. Particularly, a pixel is determined as an edge pixel if the gradient at said pixel is greater than a high threshold, and as a non-edge pixel if it is less than a low threshold. When the gradient at the pixel lies between the high threshold and low threshold, the pixel may be determined as an edge pixel only if it is adjacent to another edge pixel.

In an embodiment, prior to performing the edge detection on the grayscale image by utilizing the Canny operator, it may further include: detecting an image quality characteristic of the grayscale image; and adjusting parameters of the Canny operator adaptively based on the image quality characteristic of the grayscale image.

The image quality characteristic herein may include at least one selected from a global contrast and a global grayscale mean value. Particularly, in order to solve the problem of difficulty in balancing noise immunity and detection accuracy during the edge detection, the parameters in the Canny edge detection algorithm may be determined adaptively in this embodiment based on the image quality characteristic of the grayscale image. The image quality characteristic may for example be the global contrast, and the parameters in the Canny edge detection algorithm may for example be the high threshold and/or low threshold. Furthermore, a threshold model may also be pre-trained, such that the high threshold and/or low threshold may be adjusted adaptively based on the quality of the character region image on which the character segmentation is currently to be performed.

For example, if a grayscale image is detected to have a rather low global contrast, the grayscale image is presumed to have a rather low definition, and thus a high threshold and/or low threshold each having a higher value may be adopted; and if a grayscale image is detected to have a high global contrast, the grayscale image is presumed to have a rather high definition, and thus a high threshold and/or low threshold each having a lower value may be adopted.

It shall be understood that the high and low thresholds are determined artificially in a traditional Canny edge detection algorithm, and the ratio of the high threshold to the low threshold is fixed, which causes limitations in the application of the Canny operator. However, compared to the aforesaid embodiment, the method of adaptively adjusting the high and low thresholds according to this embodiment can reduce a large amount of undesired and unrealistic boundary information around the periphery, and further reduce the influence of noise on recognition of the defect edges, which plays a crucial role in the subsequent extraction of contours.

In an embodiment, the projection module 603 may be configured to perform segmentation on the edge binary image by utilizing a vertical projection approach, to acquire the at least one segment respectively corresponding to the at least one character frame. Particularly, an object of the aforesaid segmentation is to segment the image regions corresponding to different character frames in the edge binary image and remove the background region in each image region as much as possible, such that the amount of computation in step 104 for contour detection can be reduced.

In an embodiment, the contour detection module 604 may be configured to determine a character contour in each of the at least one segment by utilizing the contour detection algorithm and determine the target character region based on a minimum enclosing rectangle region of the character contour in each of the at least one segment. Particularly, for each of the at least one segment acquired for the at least one character frame, the determined minimum enclosing region may accommodate the entire character contour in said each segment. Optionally, the grayscale image may also be converted into a binary image with more edge information, after which a plurality of optimized segments respectively corresponding to positions of the plurality of segments acquired for the character frames may be cut out from the binary image, and then the contour detection may be performed on the plurality of optimized segments to acquire respective optimized target character regions.

Figure 7:
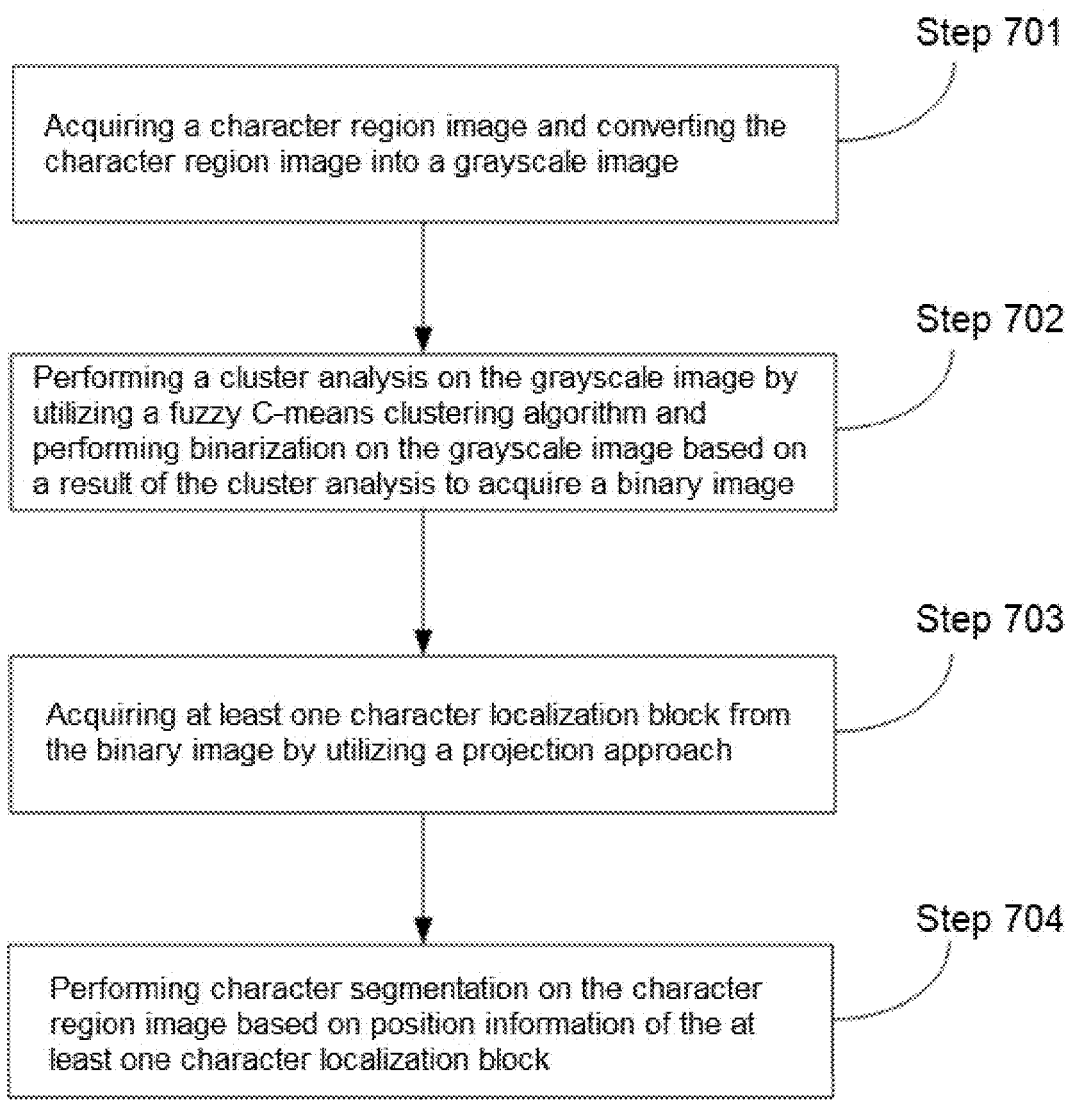
FIG. 7 is a schematic flowchart of a character segmentation method according to another embodiment of the present disclosure.

FIG. 7 is a schematic flowchart of a character segmentation method 700 according to an embodiment of the present disclosure. The character segmentation method 700 is employed to segment a character region image of a meter into character images that facilitate the subsequent processing (e.g. character recognition). In this process, the execution subject may be one or more electronic devices, and more particularly at least one camera-related processing module in said one or more electronic devices; and the execution subject may accordingly be at least one program installed on said one or more electronic devices in terms of program.

The process in FIG. 7 may include following steps 701 to 704.

Step 701: a character region image is acquired and is converted into a grayscale image.

Particularly, the meter may include, but is not limited to, a water meter, an electric meter, and a gas meter that are commonly used in daily life, and may for example be an odometer-type water meter. Furthermore, the character region image of the meter may be a single character image or a multi-character image and may be acquired by a camera device facing the meter face. Of course, the character region image may also be acquired from other sources, such as from other devices, or may be an existing image, which is not limited by this embodiment. Furthermore, the acquired character region image may be in RGB format, and after the character region image is acquired, the grayscale value of each pixel in the character region image may be determined by a floating point algorithm, an integer method, a shift method, an average method or other means, such that the grayscale image may be acquired by replacing the pixel values of the red, green, and blue channels in each pixel with the grayscale value.

Figure 8:
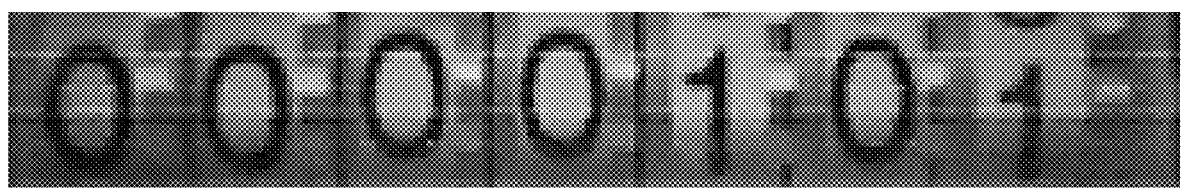
FIG. 8 is a schematic diagram of a grayscale image according to an embodiment of the present disclosure.

For example, referring to FIG. 8, a grayscale image of a character region image is illustrated, with seven characters "0", "0", "0", "0", "1", "1" and "1" shown in turn from left to right. It can be seen that, the boundaries between the aforesaid characters are not clear enough, and due to the insufficient resolution of the photocell of the camera, horizontal streaks appear in the character region image, which causes the individual characters to become connected, and thereby makes it difficult to segment the characters correctly.

Step 702: a cluster analysis is performed on the grayscale image by utilizing a fuzzy C-means clustering algorithm and binarization is performed on the grayscale image based on a result of the cluster analysis to acquire a binary image.

Particularly, the fuzzy c-means (hereinafter referred to as FCM) clustering algorithm may be an unsupervised fuzzy clustering method, which is based on an idea of maximizing the similarity between objects classified into the same cluster and minimizing the similarity between different clusters. In this embodiment, under the concept of fuzzy sets, the clusters generated by clustering may be deemed as fuzzy sets, and then the membership degrees of belonging to respective clusters may be acquired for each pixel in the grayscale image. For each pixel, a membership degree of belonging to a cluster may be a value within the interval [0, 1], and the sum of the membership degrees of belonging to respective clusters may be equal to 1. It shall be understood that the FCM algorithm is an improvement of the ordinary C-means algorithm. In the ordinary C-means algorithm, the division of data may be rigid, and the rigid clustering may classify each object to be identified strictly into a certain class with an either-or nature. However, the fuzzy c-means clustering belongs to a flexible fuzzy clustering manner, and may establish an uncertain description of the sample to the class, which is more objective to the objective world.

Figure 9:
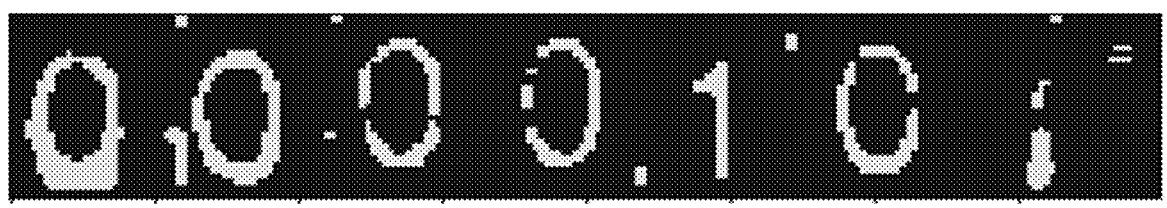
FIG. 9 is a schematic diagram of a binary image according to an embodiment of the present disclosure.

For example, FIG. 9 shows a binary image acquired after performing the cluster analysis and binarization on the grayscale image of FIG. 8 based on the aforesaid solution. After the aforesaid clustering, each cluster may be associated with one of two predetermined classes based on the clustering center of each cluster, and the two predetermined classes may be the foreground and background. Then, N clusters respectively corresponding to the highest membership degrees may be selected for each pixel, and said pixel may be determined as a foreground pixel or a background pixel based on the predetermined class associated with the N clusters. Furthermore, after determining whether each pixel is a foreground or background pixel through the aforesaid clustering analysis, the binarization may be performed on the grayscale image accordingly to acquire a binary image with the target contours being highlighted.

Step 703: at least one character localization block is acquired from the binary image by utilizing a projection approach.

Particularly, the projection approach may be implemented by performing analysis on a distribution histogram of pixels of the binary image, so as to find out the boundary points between adjacent characters and perform segmentation accordingly. Then, the image regions corresponding to different characters in the binary image may be segmented from each other, and the background region may be removed as much as possible from each image region. The projection approach herein particularly may include vertical projection and horizontal projection. The vertical projection may be preferred in this embodiment, and the at least one character localization block may be determined based on the projection positions with projection values of 0 in the vertical projection profile.

Figure 10:
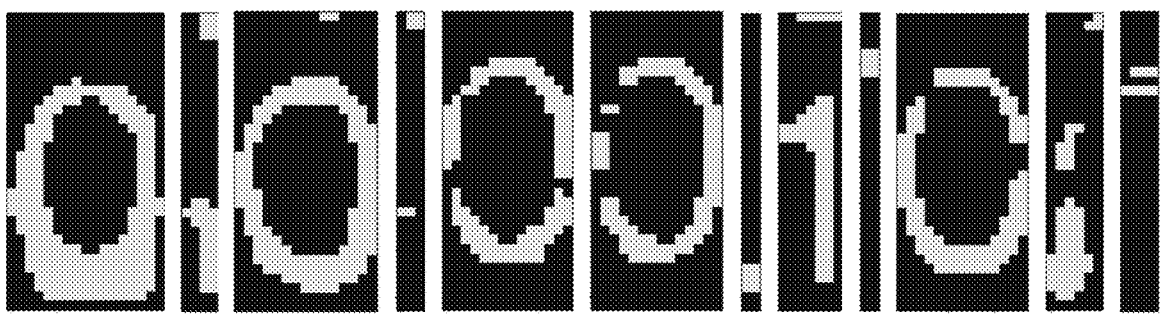
FIG. 10 is a schematic diagram of a plurality of character localization blocks according to an embodiment of the present disclosure.

For example, referring to FIG. 10, a plurality of character localization blocks acquired by segmenting the binary image of FIG. 9 after vertical projection are illustrated. The plurality of character localization blocks may include one or more interference blocks caused by noise. Therefore, a character width threshold may be set in this embodiment, such that any character localization block having a smaller width than the character width threshold may be excluded as an interference block. Alternately, the interference block may also be excluded by other solutions, which is not particularly limited in the present disclosure.

Step 704: character segmentation is performed on the character region image based on position information of the at least one character localization block.

Figure 11:
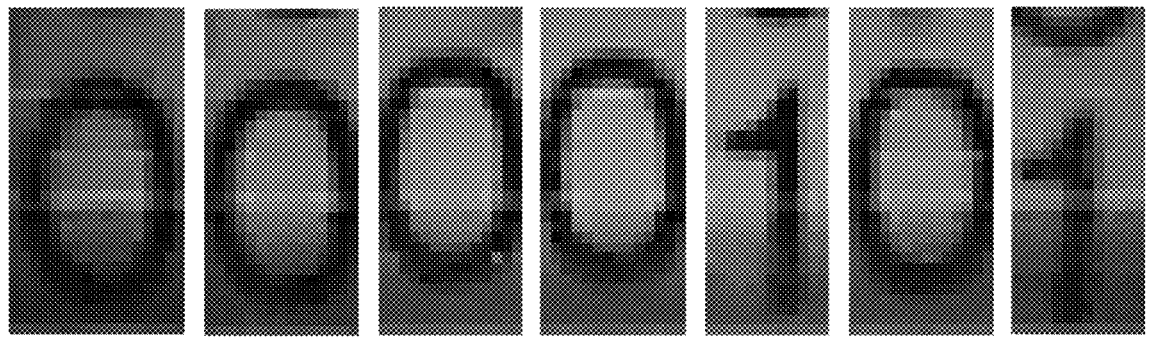
FIG. 11 is a schematic diagram of a character image acquired after character segmentation according to an embodiment of the present disclosure.

Referring to FIG. 11, a plurality of character images acquired after performing character segmentation on the character region image shown in FIG. 8 based on the position information of the plurality of character localization blocks acquired in FIG. 10 are illustrated.

In the present disclosure, binarization is performed on an original character region image by utilizing a fuzzy C-means clustering algorithm such that a binary image with most of the stains, reflections and other interferences removed can be acquired, and thus more accurate character segmentation positions can be acquired from the binary image by utilizing the projection approach. As a result, a relatively accurate character segmentation effect can be achieved for character region images with poor image qualities.

Based on the character segmentation method in FIG. 7, some embodiments of the present disclosure further provide some specific implementations and extension solutions for the character segmentation method, which will be described below.

In an embodiment, before step 702, the method 700 may further include: performing edge detection on the grayscale image by utilizing a Canny operator to acquire an edge image; performing straight line detection on the edge image by utilizing a Hough transform equation to acquire a boundary in the edge image; and removing a border portion of the grayscale image based on the boundary.

Figure 12:
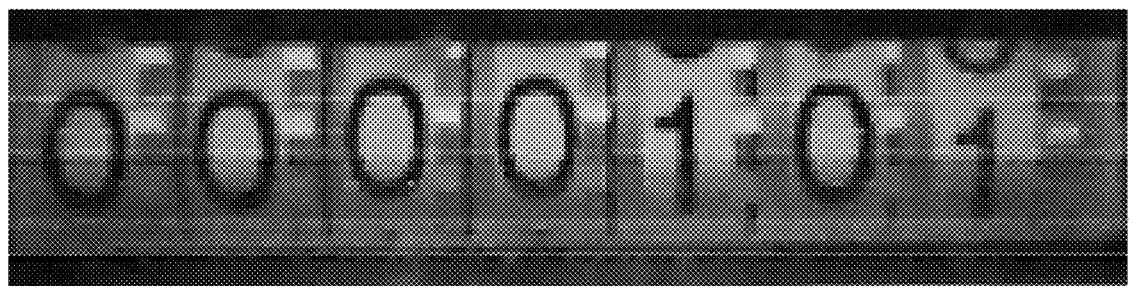
FIG. 12 is a schematic diagram of a grayscale image with upper and lower boundaries according to embodiments of the present disclosure.

Particularly, referring to FIG. 12, a grayscale image including an elongated rectangular character frame is illustrated, with seven characters "0", "0", "0", "0", "1", "1", "1", and "1" shown in turn from left to right, and the elongated rectangular character frame of the meter shown on the upper and lower sides of the characters. Therefore, the edge detection may be performed on the grayscale image by utilizing a Canny operator in this embodiment, which aims to identify the boundary of the character frame for displaying the characters in the grayscale image. Optionally, the Canny operator may also be replaced with at least one selected from the Roberts operator, Laplace operator, Prewitt operator, Sobel operator, Rosonfeld operator, and Kirsch operator. Optionally, since the object of the edge detection in this embodiment is to locate the character frame for displaying characters in the grayscale image, edge detection parameters for high noise immunity may be adopted in this embodiment to avoid too many false edges being detected. Furthermore, since the character frame forms a long straight line including a well-defined boundary, the Hough transform equation may be utilized in this embodiment for performing straight line detection on the edge image to acquire the boundary lines of the corresponding character frame. Furthermore, since the character frame has an adverse effect on the subsequent character segmentation step, the portion outside the positions corresponding to the boundary lines in the grayscale image may be removed in this embodiment, so as to avoid affecting the segmentation effect in the subsequent character segmentation.

Figure 13:
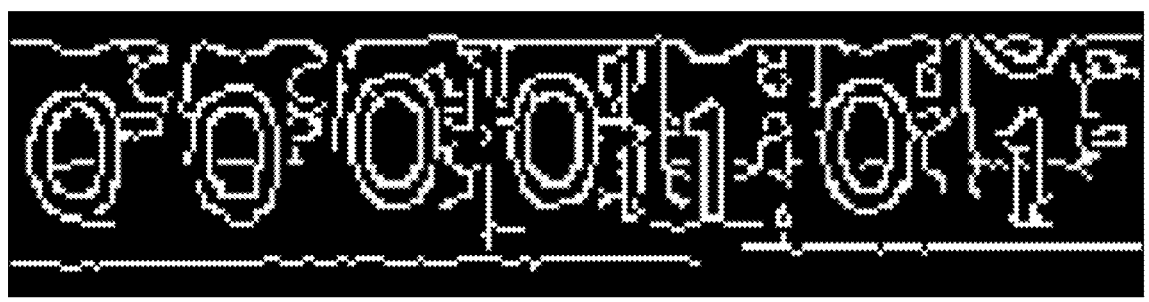
FIG. 13 is a schematic diagram of an edge image according to an embodiment of the present disclosure.

For example, referring to FIG. 13, the edge image acquired after performing the edge detection on the grayscale image including the elongated rectangular character frame shown in FIG. 12 is illustrated. It can be seen that, there are distinct straight lines at the upper and lower portions of the edge image shown in FIG. 13, thus enabling easy detection of the boundary lines by utilizing the Hough transform equation. Furthermore, the grayscale image shown in FIG. 8 may be acquired by removing in FIG. 12 the corresponding border portion based on the positions of the detected boundary lines. Optionally, horizontal projection may also be performed on the binary image before step 703, and the upper and lower border portions relative to the character frame may be located and removed according to the projection positions with the projection values of 0 in the horizontal projection profile.

Compared with the aforesaid embodiment, the character segmentation errors caused by the character frame included in the character region image can be avoided by the edge detection and the straight line detection, thereby improving the accuracy of character segmentation.

In an embodiment, the method, during performing the edge detection on the grayscale image by utilizing the Canny operator, may further include: detecting an image quality characteristic of the grayscale image; and adjusting parameters of the Canny operator adaptively based on the image quality characteristic of the grayscale image.

Particularly, the image quality characteristic may include a global contrast, a global grayscale mean, and other feature values for representing the image quality. Particularly, in order to further solve the problem of difficulty in balancing noise immunity and detection accuracy during the edge detection, the parameters in the Canny operator may be determined adaptively in embodiments of the present disclosure based on the image quality characteristic of the grayscale image. The image quality characteristic may for example be a global contrast, and the parameters in the Canny operator may for example be a high threshold and/or low threshold. For example, if a grayscale image is detected to have a rather low global contrast, the grayscale image may be presumed to have a rather low definition, and thus a high threshold and/or low threshold each having a higher value may be adopted; and if a grayscale image is detected to have a rather high global contrast, the grayscale image may be presumed to have a rather high definition, and thus a high threshold and/or low threshold each having a lower value may be adopted.

It shall be understood that the double-threshold detection shall be applied in the Canny operator to determine the true and potential edges. For example, a pixel may be considered as an edge pixel if the gradient at said pixel is greater than a high threshold, and may be determined as a non-edge pixel if it is less than a low threshold. When the gradient at said pixel lies between the high threshold and low threshold, the pixel may be considered as an edge pixel only if it is adjacent to another edge pixel. However, in the traditional Canny operator, the high and low thresholds are determined artificially, and the ratio of the high threshold to the low threshold is fixed, which causes limitations in the application of the Canny operator. In view of this, a method of adaptively adjusting the high threshold and low threshold according to the image quality characteristic of the grayscale image may be applied in this embodiment. Therefore, compared to the aforesaid embodiment, this embodiment can reduce a large amount of undesired and unrealistic boundary information around the periphery, and reduce the influence of noise on recognition of the defect edges, which plays a crucial role in the subsequent Hough transform. Optionally, a parameter model may also be pre-trained, such that the parameters can be adjusted adaptively based on the quality of the character region image on which the character segmentation is currently to be performed.

In an embodiment, in order to reduce the noise influence on the edge detection, the method 700, prior to performing the edge detection on the grayscale image by utilizing the Canny operator, may further include performing filtering on the grayscale image. The filtering herein may be median filtering and/or Gaussian filtering.

Particularly, in order to minimize the noise influence on the result of edge detection, the noise shall be filtered out to prevent false detection caused by noise. Therefore, Gaussian filtering and/or median filtering may be adopted in this embodiment to convolve the grayscale image, so as to reduce the significant noise influence and smooth the image. The Gaussian filtering herein may be a linear smoothing filtering suitable for eliminating Gaussian noise. The median filtering may be a nonlinear smoothing filtering, which sets the grayscale value of each pixel in the processed image to a median value of grayscale values of all pixels in a certain neighborhood window of said pixel. The median filtering has a good filtering effect on the impulse noise, and can protect the edges of the signal from being blurred while filtering the noise.

Compared to the aforesaid embodiment, Gaussian filtering and/or median filtering is performed on the grayscale image in this embodiment, which can reduce the noise influence caused by stains or reflections on the meter, and thereby improve the accuracy of the subsequent edge detection.

In an embodiment, in order to further eliminate the adverse effect of noisy points on the clustering, the method 700, before performing step 702, may further include performing logarithmic transformation on the grayscale image. The object of performing the logarithmic transformation on the grayscale image is to increase the contrast of the grayscale image. Particularly, the logarithmic transformation may expand the low grayscale-value portion of the grayscale image and compress the high grayscale-value portion of the grayscale image, such that the object of emphasizing the low grayscale-value portion of the image can be achieved. Therefore, a superior enhancement effect can be achieved for images with relatively low overall contrasts and relatively low grayscale values.

In an embodiment, in order to acquire a binary image with most of the stains, reflections and other interferences further removed, step 702 may include: determining attributes of the C clusters based on clustering centers of the C clusters respectively; determining, for each pixel of the grayscale image, C membership degrees respectively corresponding to the C clusters; sorting the C clusters according to the C membership degrees to determine N clusters therein and determining an attribute of said each pixel of the grayscale image based on attributes of the N clusters, with the C and the N being positive integers and the C being greater than the N; and performing the binarization on the grayscale image based on the attribute of said each pixel of the grayscale image.

Particularly, the aforesaid C and N are adjustable dynamic parameters that can be combined to produce various thresholds. Furthermore, determining the attributes of the C clusters based on the clustering centers of the C clusters respectively may particularly be implemented by determining that the attribute of each cluster is a foreground or a background by determining whether the grayscale value of the clustering center of each cluster exceeds a predetermined threshold. Furthermore, sorting the C clusters based on the C membership degrees to determine the N clusters therein may particularly be implemented by selecting the N clusters respectively corresponding to the highest membership degrees. Furthermore, determining the attribute of said each pixel of the grayscale image based on attributes of the N clusters may refer to determining the attribute of said each pixel of the grayscale image by overall consideration of the attributes of the N clusters. For example, for a certain pixel, it may be determined as a foreground pixel only when the attributes of the corresponding N clusters are foregrounds; otherwise said pixel may be determined as a background pixel. For another example, for a certain pixel, it may be determined as a foreground pixel when a proportion of clusters having respective attributes that are foregrounds exceeds a predetermined proportion among the corresponding N clusters; otherwise, said pixel may be determined as a background pixel.

For example, it is preset that C equals to 5 and N equals to 2, and the preset rule is that a pixel is determined as a foreground pixel only when the attributes of the N clusters corresponding to the pixel are all foregrounds; otherwise the pixel is determined as a background pixel. In view of this, the FCM algorithm may be utilized to output the membership degrees respectively corresponding to the five clusters $C_1$, $C_2$, $C_3$, $C_4$, and $C_5$ for each pixel in the grayscale image, and the clustering center of each cluster. The clustering center represents the average feature of each class, thus whether each cluster corresponds to a background class or a foreground class may be determined based on the clustering center, for example, $C_1$ belongs to the foreground; $C_2$ belongs to the foreground; $C_3$ belongs to the background; $C_4$ belongs to the background; and $C_5$ belongs to the background. Furthermore, for a pixel A in the grayscale image, its membership degrees respectively corresponding to five clusters $C_1$, $C_2$, $C_3$, $C_4$, and $C_5$ may be acquired as $b_1$, $b_2$, $b_3$, $b_4$, and $b_5$. If $b_2 > b_3 > b_1 > b_4 > b_5$, the two greatest membership degrees $b_2$ and $b_3$ may be selected therefrom, and the pixel A may be determined as a foreground pixel or a background pixel based on the two clusters $C_2$ and $C_3$ corresponding to the selected membership degrees. Here, the pixel A may be determined as a background pixel based on the aforesaid preset rule.

Compared to the aforesaid embodiment, the noise in the binary image can be further reduced in this embodiment while preserving the basic contour of the character, thereby optimizing the character segmentation effect.

In an embodiment, referring to FIG. 10, there are several interference blocks caused by noise in the at least one acquired character localization block. In order to more accurately exclude the interference blocks, the method 700, after step 703, may further include: detecting a foreground pixel area in each of the at least one character localization block; and detecting an interference block from the at least one character localization block based on the foreground pixel area and excluding the interference block from the at least one character localization block, where the foreground pixel area in the interference block may be at least less than any of foreground pixel areas of M character localization blocks among the at least one character localization block, M referring to the predetermined number of characters.

Particularly, the foreground pixel area may refer to the area occupied by the foreground pixels in the character localization block. Optionally, in order to further save the computational effort, horizontal projection may be performed on each character localization block to acquire a character height, and the foreground pixel area may be derived from the width of the character localization block and the character height. The M which is the predetermined number of characters is pre-determined depending on the face of the meter. Furthermore, as shown in FIG. 10, the interference blocks caused by noise generally have fewer foreground pixels. Therefore, the at least one character localization block may be sorted from largest to smallest based on the foreground pixel area, and the top M character localization blocks may be selected for the subsequent step 704, and the remaining character localization blocks may be excluded as interference blocks.

Compared with the aforesaid embodiment, the interference blocks caused by noise are determined in this embodiment based on the foreground pixel area of each character localization block, which avoids the situation in which the character localization blocks corresponding to real characters and each having a relatively small character width are detected incorrectly as interference blocks, thus can achieve a relatively accurate exclusion effect, and further optimize the character segmentation effect.

In an embodiment, referring to FIG. 10, the at least one acquired character localization block may include several interference blocks caused by noise. In order to exclude the interference blocks more accurately, the method 700, after step 703, may further include excluding an interference block from the at least one character localization block by utilizing a non-nearest suppression (herein after referred to as NNS) algorithm.

Particularly, excluding the interference block from the at least one character localization block by utilizing the NNS algorithm may particularly include: finding a leftmost foreground pixel and a rightmost foreground pixel in the aforesaid binary image; determining a character golden center corresponding to each character based on the position information of the leftmost foreground pixel and the rightmost foreground pixel and the width therebetween; and selecting the character localization block closest to the character golden center of each character for the subsequent step 704 and excluding the remaining character localization blocks as interference blocks.

Compared to the aforesaid embodiment, the interference blocks caused by noise can be excluded accurately and simply in this embodiment, which further optimizes the character segmentation effect.

In an embodiment, since some characters (e.g., the number "1" or "7") have relatively small widths, which may easily lead to incomplete character segmentation. In view of this, step 704 may particularly further include: determining an average width of the at least one character localization block; and performing, if a target character localization block having a smaller width than the average width is included in the at least one character localization block, the character segmentation on the character region image based on position information of the target character localization block and the average width. As a result, incomplete character segmentation can be avoided.

Figure 14:
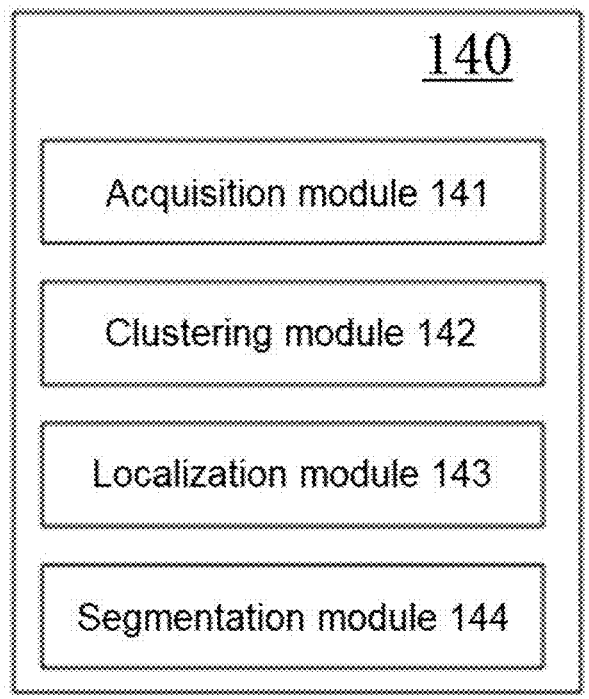
FIG. 14 is a schematic structural diagram of a character segmentation device according to another embodiment of the present disclosure.

FIG. 14 is a schematic structural diagram of a character segmentation device 140 according to an embodiment of the present disclosure for performing the character segmentation method shown in FIG. 7.

As shown in FIG. 14, the character segmentation device 140 includes an acquisition module 141 configured to acquire a character region image and convert the character region image into a grayscale image. Particularly, the meter may include, but is not limited to, a water meter, an electric meter, and a gas meter that are commonly used in daily life, and may for example be an odometer-type water meter. Furthermore, the character region image of the meter may be a single character image or a multi-character image and may be acquired by a camera device facing the meter face. Of course, the character region image may also be acquired from other sources, such as from other devices, or may be an existing image, which is not limited by this embodiment. Furthermore, the acquired character region image may be in RGB format, and after the character region image is acquired, the grayscale value of each pixel in the character region image may be determined by a floating point algorithm, an integer method, a shift method, an average method or other means, such that the grayscale image may be acquired by replacing the pixel values of the red, green, and blue channels in each pixel with the grayscale value.

For example, referring to FIG. 8, a grayscale image of a character region image is illustrated, with seven characters "0", "0", "0", "0", "1", "1" and "1" shown in turn from left to right. It can be seen that, the boundaries between the aforesaid characters are not clear enough, and due to the insufficient resolution of the photocell of the camera, horizontal streaks appear in the character region image, which causes the individual characters to become connected, and thereby makes it difficult to segment the characters correctly.

As shown in FIG. 8, the character segmentation device 140 further includes a clustering module 142 configured to perform a cluster analysis on the grayscale image by utilizing a fuzzy C-means clustering algorithm and perform binarization on the grayscale image based on a result of the cluster analysis to acquire a binary image. Particularly, the fuzzy c-means (hereinafter referred to as FCM) clustering algorithm is an unsupervised fuzzy clustering method, which is based on an idea of maximizing the similarity between objects classified into the same cluster and minimizing the similarity between different clusters. In this embodiment, under the concept of fuzzy sets, the clusters generated by clustering may be deemed as fuzzy sets, and then the membership degrees of belonging to respective clusters may be acquired for each pixel in the grayscale image. For each pixel, a membership degree of belonging to a cluster may be a value within the interval [0, 1], and the sum of the membership degrees of belonging to respective clusters may be equal to 1. It shall be understood that the FCM algorithm is an improvement of the ordinary C-means algorithm. In the ordinary C-means algorithm, the division of data may be rigid, and the rigid clustering may classify each object to be identified strictly into a certain class with an either-or nature. However, the fuzzy c-means clustering belongs to a flexible fuzzy clustering manner, and may establish an uncertain description of the sample to the class, which is more objective to the objective world.

For example, FIG. 9 shows a binary image acquired after performing the cluster analysis and binarization on the grayscale image of FIG. 8 based on the aforesaid solution. After the aforesaid clustering, each cluster may be associated with one of two predetermined classes based on the clustering center of each cluster, and the two predetermined classes may be foreground and background. Then, N clusters respectively corresponding to the highest membership degrees may be selected for each pixel, and said pixel may be determined as a foreground pixel or a background pixel based on the predetermined class associated with the N clusters. Furthermore, after determining whether each pixel is a foreground or background pixel through the aforesaid clustering analysis, the binarization may be performed on the grayscale image accordingly to acquire a binary image with the target contours being highlighted.

As shown in FIG. 14, the character segmentation device 140 further includes a localization module 143 configured to acquire at least one character localization block from the binary image by utilizing a projection approach. Particularly, the projection approach may be implemented by performing analysis on a distribution histogram of pixels of the binary image, so as to find out the boundary points between adjacent characters and perform segmentation accordingly. Then, the image regions corresponding to different characters in the binary image may be segmented from each other, and the background region may be removed as much as possible from each image region. The projection approach herein particularly may include vertical projection and horizontal projection. The vertical projection may be preferred in this embodiment, and the at least one character localization block may be determined based on the projection positions with projection values of 0 in the vertical projection profile.

For example, referring to FIG. 10, a plurality of character localization blocks acquired by segmenting the binary image of FIG. 9 after vertical projection are illustrated. The plurality of character localization blocks may include one or more interference blocks caused by noise. Therefore, a character width threshold may be set in this embodiment, such that any character localization block having a smaller width than the character width threshold may be excluded as an interference block. Alternately, the interference blocks may also be excluded by other solutions, which is not particularly limited in the present disclosure.

As shown in FIG. 14, the character segmentation device 140 further includes a segmentation module 144 configured to perform character segmentation on the character region image based on position information of the at least one character localization block. Referring to FIG. 11, a plurality of character images acquired after perform the character segmentation on the character region image shown in FIG. 8 based on the position information of the plurality of character localization blocks acquired in FIG. 10 are illustrated.

In the present disclosure, binarization is performed on an original character region image by utilizing a fuzzy C-means clustering algorithm, such that a binary image with most of the stains, reflections and other interferences removed can be acquired, and thus more accurate character segmentation positions can be acquired from the binary image by utilizing the projection approach. As a result, a relatively accurate character segmentation effect can be achieved for character region images with poor image qualities.

Based on the character segmentation device in FIG. 14, some embodiments of the present disclosure further provide some specific implementations and extension solutions for the character segmentation device, which will be described below.

In an embodiment, the character segmentation device 140 may further include: an edge detection module configured to perform edge detection on the grayscale image by utilizing a Canny operator to acquire an edge image; a straight line detection module configured to perform straight line detection on the edge image by utilizing a Hough transform equation to acquire a boundary in the edge image; and a border removing module configured to remove a border portion of the grayscale image based on the boundary.

Particularly, referring to FIG. 12, a grayscale image including an elongated rectangular character frame is illustrated, with seven characters "0", "0", "0", "0", "1", "1", "1", and "1" shown in turn from left to right in the grayscale image, and the elongated rectangular character frame of the meter shown on the upper and lower sides of the characters. Therefore, the edge detection may be performed on the grayscale image by utilizing a Canny operator in this embodiment, which aims to identify the boundary of the character frame for displaying the characters in the grayscale image. Optionally, the Canny operator may also be replaced with at least one selected from the Roberts operator, Laplace operator, Prewitt operator, Sobel operator, Rosonfeld operator, and Kirsch operator. Optionally, since the object of the edge detection in this embodiment is to locate the character frame for displaying characters in the grayscale image, edge detection parameters for high noise immunity may be adopted in this embodiment to avoid too many false edges being detected. Furthermore, since the character frame forms a long straight line including a well-defined boundary, the Hough transform equation may be utilized in this embodiment for performing straight line detection on the edge image to acquire the boundary lines of the corresponding character frame. Furthermore, since the character frame has an adverse effect on the subsequent character segmentation step, the portion outside the positions corresponding to the boundary lines in the grayscale image is removed in this embodiment, so as to avoid affecting the segmentation effect in the subsequent character segmentation process.

For example, referring to FIG. 13, the edge image acquired after performing the edge detection on the grayscale image including the elongated rectangular character frame shown in FIG. 12 is illustrated. It can be seen that, there are distinct straight lines at the upper and lower portions of the edge image shown in FIG. 13, thus enabling easy detection of the boundary lines by utilizing the Hough transform equation. Furthermore, the grayscale image shown in FIG. 8 may be acquired by removing the corresponding border portion based on the positions of the detected boundary lines in FIG. 12. Optionally, horizontal projection may also be performed on the binary image, and the upper and lower border portions relative to the character frame may be located and removed according to the projection positions with the projection values of 0 in the horizontal projection profile.

Compared with the aforesaid embodiment, the character segmentation errors caused by character frame included in the character region image can be avoided by the edge detection module, the straight line detection module and the border removing module, thereby improving the accuracy of character segmentation.

In an embodiment, the edge detection module may also include a quality detection module and a parameter adjustment module, where the quality detection module may be configured to detect an image quality characteristic of the grayscale image, and the parameter adjustment module may be configured to adjust parameters of the Canny operator adaptively based on the image quality characteristic of the grayscale image. Particularly, the image quality characteristic may include a global contrast, a global grayscale mean, and other feature values for representing the image quality. Particularly, in order to further solve the problem of difficulty in balancing noise immunity and detection accuracy during the edge detection, the parameters in the Canny operator may be determined adaptively in embodiments of the present disclosure based on the image quality characteristic of the grayscale image. The image quality characteristics may for example be a global contrast, and the parameters in the Canny operator may for example be a high threshold and/or low threshold. For example, if a grayscale image is detected to have a relatively low global contrast, the grayscale image is presumed to have a rather low definition, and thus a high threshold and/or low threshold each having a higher value may be adopted; and if a grayscale image is detected to have a relatively high global contrast, the grayscale image is presumed to have a rather high definition, and thus a high threshold and/or low threshold each having a lower value may be adopted.

It shall be understood that the double-threshold detection shall be applied in the Canny operator to determine the true and potential edges. For example, a pixel may be considered as an edge pixel if the gradient at said pixel is greater than a high threshold, and as a non-edge pixel if it is less than a low threshold. When the gradient at said pixel lies between the high threshold and low threshold, the pixel may be considered as an edge pixel only if it is adjacent to another edge pixel. However, in the traditional Canny operator, the high and low thresholds are determined artificially, and the ratio of the high threshold to the low threshold is fixed, which causes limitations in the application of the Canny operator. In view of this, a method of adaptively adjusting the high threshold and low threshold according to the image quality characteristic of the grayscale image may be applied in this embodiment. Therefore, compared to the aforesaid embodiment, this embodiment can reduce a large amount of undesired and unrealistic boundary information around the periphery, and reduce the influence of noise on recognition of the defect edges, which plays a crucial role in the subsequent Hough transform process. Optionally, a parameter model may be pre-trained, such that the parameters can be adjusted adaptively based on the quality of the character region image on which the character segmentation is currently to be performed.

In an embodiment, in order to reduce the influence of noise on the edge detection, the character segmentation device 140 may further include a filtering module configured to perform filtering on the grayscale image before the edge detection is performed on the grayscale image by utilizing the Canny operator. The filtering may include median filtering and/or Gaussian filtering. Particularly, in order to minimize the noise influence on the result of edge detection, the noise shall be filtered out to prevent false detection caused by noise. Therefore, Gaussian filtering and/or median filtering may be adopted in this embodiment to convolve the grayscale image, so as to reduce the significant noise influence and smooth the image. The Gaussian filtering herein is a linear smoothing filtering suitable for eliminating Gaussian noise. The median filtering is a nonlinear smoothing filtering, which sets the grayscale value of each pixel in the processed image to a median value of grayscale values of all pixels in a certain neighborhood window of said pixel. The median filtering has a good filtering effect on the impulse noise, and can protect the edges of the signal from being blurred while filtering the noise.

Compared to the aforesaid embodiment, Gaussian filtering and/or median filtering is performed on the grayscale image in this embodiment, which can reduce the noise influence caused by stains or reflections on the meter, and thereby improve the accuracy of the subsequent edge detection.

In an embodiment, in order to further reduce the adverse influence of noise on the edge detection, the character segmentation device 140 may further include a logarithmic transformation module configured to perform logarithmic transformation on the grayscale image. The object of the aforementioned logarithmic transformation of the grayscale image is to increase the contrast of the grayscale image. Particularly, the logarithmic transformation may expand the low grayscale-value portion of the grayscale image and compress the high grayscale-value portion of the grayscale image, such that the object of emphasizing the low grayscale-value portion of the image can be achieved. Therefore, a better enhancement effect can be achieved for images with relatively low overall contrasts and relatively low grayscale values.

In an embodiment, in order to acquire a binary image with most of the stains, reflections and other interferences further removed, the clustering module 142 may be configured to: determine attributes of the C clusters based on clustering centers of the C clusters respectively; determine, for each pixel of the grayscale image, C membership degrees respectively corresponding to the C clusters; sort the C clusters based on the C membership degrees to determine N clusters therein and determine an attribute of said each pixel of the grayscale image based on attributes of the N clusters, with the C and the N being positive integers and the C being greater than the N; and perform the binarization on the grayscale image based on the attribute of said each pixel of the grayscale image. Particularly, the aforesaid C and N may be adjustable dynamic parameters that can be combined to produce various thresholds. Furthermore, determining the attributes of the C clusters based on the clustering centers of the C clusters respectively may particularly be implemented by determining that the attribute of each cluster is a foreground or a background by determining whether the grayscale value of the clustering center of each cluster exceeds a predetermined threshold. Furthermore, sorting the C clusters based on the C membership degrees to determine the N clusters therein may particularly be implemented by selecting the N clusters respectively corresponding to the highest membership degrees. Furthermore, determining the attribute of said each pixel of the grayscale image based on attributes of the N clusters may refer to determining the attribute of each pixel of the grayscale image by overall consideration of the attributes of the N clusters. For example, for a certain pixel, the pixel is determined as a foreground pixel only when the attributes of the corresponding N clusters are foreground; otherwise the pixel is determined as a background pixel. For another example, for a certain pixel, it may be determined as a foreground pixel when a proportion of clusters having respective attributes that are foregrounds exceeds a predetermined proportion among the corresponding N clusters; otherwise, the pixel may be determined as a background pixel.

For example, it is preset that C equals to 5 and N equals to 2, and the preset rule is that a pixel is determined as a foreground pixel only when the attributes of the N clusters corresponding to the pixel are all foregrounds; otherwise the pixel is determined as a background pixel. In view of this, the FCM algorithm may be utilized to output the membership degrees respectively corresponding to the five clusters $C_1$, $C_2$, $C_3$, $C_4$, and $C_5$ for each pixel in the grayscale image, and the clustering center of each cluster. The clustering center represents the average feature of each class, thus whether each cluster corresponds to a background class or a foreground class may be determined based on the clustering center. For example, $C_1$ belongs to the foreground; $C_2$ belongs to the foreground; $C_3$ belongs to the background; $C_4$ belongs to the background; and $C_5$ belongs to the background. Furthermore, for the pixel A in the grayscale image, its membership degrees respectively corresponding to five clusters $C_1$, $C_2$, $C_3$, $C_4$, and $C_5$ may be acquired as $b_1$, $b_2$, $b_3$, $b_4$, and $b_5$. If $b_2 > b_3 > b_1 > b_4 > b_5$, the two greatest membership degrees $b_2$ and $b_3$ may be selected therefrom, and the pixel A may be determined as a foreground pixel or a background pixel based on the two clusters $C_2$ and $C_3$ respectively corresponding to the selected membership degrees. Here, the pixel A may be determined as a background pixel based on the aforesaid preset rule.

Compared to the aforesaid embodiment, the noise in the binary image can be further reduced in this embodiment while preserving the basic contour of the character, thereby optimizing the character segmentation effect.

In an embodiment, referring to FIG. 10, the at least one acquired character localization block may include several interference blocks caused by noise. In order to exclude the interference blocks more accurately, the character segmentation device 140 may further include a first exclusion module configured to: detect a foreground pixel area of each of the at least one character localization block; and detect an interference block from the at least one character localization block based on the foreground pixel area and exclude the interference block from the at least one character localization block, where the foreground pixel area in the interference block may be at least less than any of foreground pixel areas of M character localization blocks among the at least one character localization block, M referring to the predetermined number of characters. Particularly, the foreground pixel area may refer to the area occupied by the foreground pixels in the character localization block. Optionally, in order to further save the computational effort, horizontal projection may be performed on each character localization block to acquire a character height, and the foreground pixel area may be derived from the width of the character localization block and the character height. The M which is the preset number of characters is pre-determined depending on the face of the meter. Furthermore, as shown in FIG. 10, the interference blocks caused by noise generally include fewer foreground pixels. Therefore, the at least one character localization block may be sorted from largest to smallest based on the foreground pixel area, and the top M character localization blocks may be selected to be input into the segmentation module 144, and the remaining character localization blocks may be excluded as interference blocks.

Compared with the aforesaid embodiment, the interference blocks caused by noise are determined in this embodiment based on the foreground pixel area of each character localization block, which avoids the situation in which the character localization blocks corresponding to real characters and each having a relatively small character width are detected incorrectly as interference blocks, thus can achieve a relatively accurate exclusion effect, and further optimize the character segmentation effect.

In an embodiment, referring to FIG. 10, the at least one acquired character localization block may include several interference blocks caused by noise. In order to exclude the interference blocks more accurately, the character segmentation device 140 may further include a second exclusion module configured to exclude an interference block from the at least one character localization block by utilizing a non-nearest suppression algorithm (herein after referred to as NNS). Particularly, excluding the interference block from the at least one character localization block by utilizing the NNS algorithm may particularly include: finding a leftmost foreground pixel and a rightmost foreground pixel in the aforesaid binary image; determining a character golden center corresponding to each character based on the position information of the leftmost foreground pixel and the rightmost foreground pixel and the width therebetween; and selecting the character localization block closest to the character golden center of each character to input it into the segmentation module 144 and excluding the remaining character localization blocks as interference blocks.

Compared to the aforesaid embodiment, the interference blocks caused by noise can be excluded accurately and simply in this embodiment, which further optimizes the character segmentation effect.

In an embodiment, since some characters (e.g., the number "1" or "7") have relatively small widths, which may easily lead to incomplete character segmentation. In view of this, the segmentation module 144 may be configured to determine an average width of the at least one character localization block, where if a target character localization block having a smaller width than the average width is included in the at least one character localization block, the character segmentation may be performed on the character region image based on position information of the target character localization block and the average width, thereby avoiding incomplete character segmentation.

Figure 15:
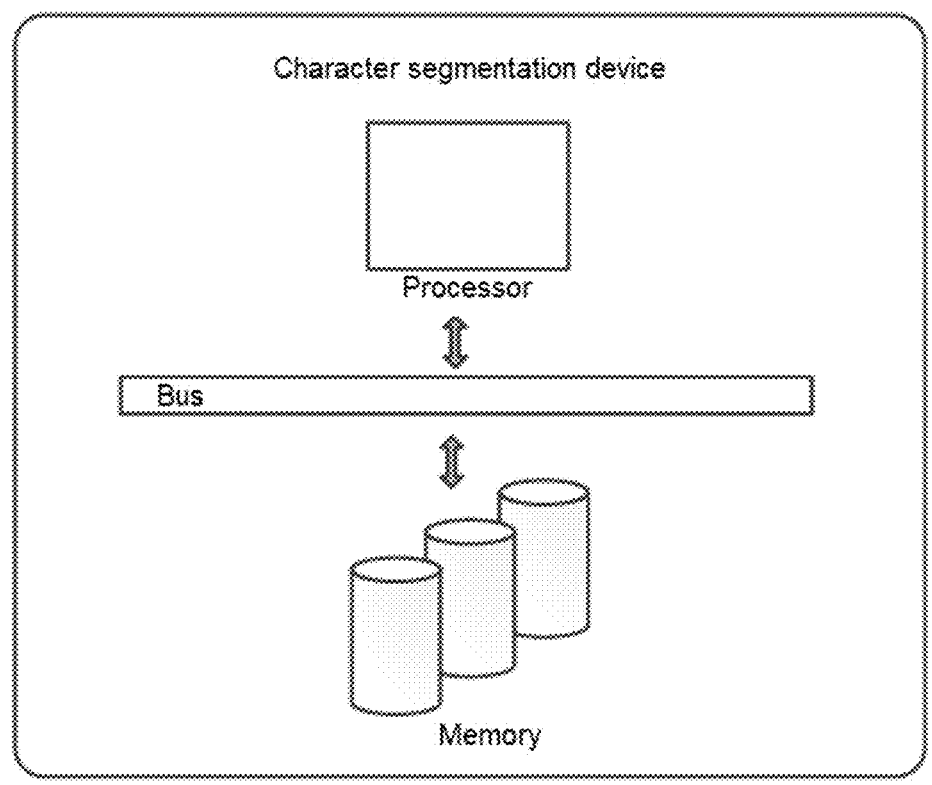
FIG. 15 is a schematic structural diagram of a character segmentation device according to still another embodiment of the present disclosure.

FIG. 15 shows a character segmentation device according to an embodiment of the present disclosure. The device includes at least one processor and a memory communicatively connected to the at least one processor. The memory has instructions executable by the at least one processor stored therein, where the instructions, when executed by the at least one processor, cause the at least one processor to implement the character segmentation method illustrated in FIG. 1, and/or to implement another character segmentation method illustrated in FIG. 7.

According to some embodiments of the present disclosure, provided is a non-transitory computer storage medium for a character segmentation method, which has computer-executable instructions stored thereon. The computer-executable instructions are configured to, when executed by a processor, cause the character segmentation method shown in FIG. 1 to be implemented, and/or to cause the character segmentation method shown in FIG. 7 to be implemented.

In an embodiment of the present disclosure, provided is an intelligent meter reading system. The system includes: a meter with a face including at least one character frame for displaying a reading; a camera device for photographing the face of the meter to acquire a character region image; and a character segmentation device electrically connected to the camera device and configured to implement the character segmentation method shown in FIG. 1 and/or the character segmentation method shown in FIG. 7.

The respective embodiments of the present disclosure are described in a progressive manner. The reference may be made to each other for the same or similar parts of the respective embodiments, and each embodiment focuses on the differences from other embodiments. Especially, for the embodiments of the device, apparatus and computer-readable storage medium, since they basically correspond to the embodiments of the method, they are described in a simple way, and reference may be made to the description part on embodiments of the method for relevant points.

The device, apparatus and computer-readable storage medium according to embodiments of the present disclosure correspond to the method one by one. Therefore, the apparatus and computer-readable storage medium have similar beneficial technical effects with the corresponding method. Since the beneficial technical effects of the method have been described in detail above, the beneficial technical effects of the apparatus and computer-readable storage medium will not be repeated here.

Those skilled in the art should understand that the embodiments of the present disclosure may be provided as a method, a system, or a computer program product. Therefore, the present disclosure may be in the form of full hardware embodiments, full software embodiments, or a combination thereof. Moreover, the present disclosure may be in the form of a computer program product that is implemented on one or more computer-usable storage medium (which includes, but is not limited to, magnetic disk storage, CD-ROM, optical storage) containing computer-usable program codes.

The present disclosure is described referring to the flowchart and/or block diagram of the method, device (system) and computer program product according to the embodiments of the present disclosure. It should be understood that each flow and/or block in the flowchart and/or block diagram and the combination of flow and/or block in the flowchart and/or block diagram may be realized via computer program instructions. Such computer program instructions may be provided to the processor of a general-purpose computer, a special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture including a commander equipment, where the commander equipment may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be used to store information that can be accessed by computing devices. Furthermore, although the operations of the method of the present disclosure are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A character segmentation method, comprising:
   acquiring a character region image and converting the character region image into a grayscale image, wherein the character region image comprises at least one character frame;
   adaptively adjusting parameters of an edge detection algorithm based on image quality characteristics of the grayscale image, and converting the grayscale image into an edge binary image by utilizing the edge detection algorithm;
   acquiring, from the edge binary image, at least one segment for the at least one character frame by utilizing a projection approach;
   determining a character contour in each of the at least one segment by utilizing a contour detection algorithm; and
   determining a minimum enclosing rectangle region of the character contour in each of the at least one segment and performing character segmentation on the character region image based on the minimum enclosing rectangle region.

2. The character segmentation method according to claim 1, further comprising, prior to converting the grayscale image into the edge binary image by utilizing the edge detection algorithm:
   performing median filtering and/or Gaussian filtering on the grayscale image.

3. The character segmentation method according to claim 1, wherein utilizing the edge detection algorithm comprises utilizing a Canny operator.

4. The character segmentation method according to claim 1, wherein the image quality characteristics comprise at least one of a global contrast or a global grayscale mean value.

5. The character segmentation method according to claim 1, wherein utilizing the projection approach comprises:
   performing segmentation on the edge binary image by a vertical projection to acquire the at least one segment for the at least one character frame.

6. A character segmentation device, comprising:
   an acquisition module configured to acquire a character region image and convert the character region image into a grayscale image, wherein the character region image comprises at least one character frame;
   an edge detection module configured to adaptively adjust parameters of an edge detection algorithm based on image quality characteristics of the grayscale image, and convert the grayscale image into an edge binary image by utilizing the edge detection algorithm;
   a projection module configured to acquire, from the edge binary image, at least one segment for the at least one character frame by utilizing a projection approach; and
   a contour detection module configured to determine a character contour in each of the at least one segment by utilizing a contour detection algorithm, and determine a minimum enclosing rectangle region of the character contour in each of the at least one segment and perform character segmentation on the character region image based on the minimum enclosing rectangle region.

7. A character segmentation device, comprising:
   one or more multicore processors; and
   a memory having one or more programs stored therein, wherein the one or more programs, when executed by the one or more multicore processors, cause the one or more multicore processors to implement the character segmentation method according to claim 1.

8. A non-transitory computer-readable storage medium having programs stored thereon, wherein the programs, when executed by a multicore processor, cause the multicore processor to implement the character segmentation method according to claim 1.

* * * * *